(12) United States Patent
Sasazaki

(10) Patent No.: US 9,838,639 B2
(45) Date of Patent: Dec. 5, 2017

(54) TRANSMISSION APPARATUS, DISPLAY APPARATUS, AND IMAGE DISPLAY SYSTEM

(75) Inventor: Yukihiro Sasazaki, Tokyo (JP)

(73) Assignee: Sony Corporation (JP)

( * ) Notice: Subject to any disclaimer, the term of this patent is extended or adjusted under 35 U.S.C. 154(b) by 1388 days.

(21) Appl. No.: 12/661,962

(22) Filed: Mar. 26, 2010

(65) Prior Publication Data

US 2010/0259691 A1  Oct. 14, 2010

(30) Foreign Application Priority Data

Apr. 10, 2009 (JP) .................. P2009-095468

(51) Int. Cl.
| | |
|---|---|
| *H04N 5/38* | (2006.01) |
| *G09G 5/00* | (2006.01) |
| *G09G 5/12* | (2006.01) |
| *H04N 5/775* | (2006.01) |
| *H04N 21/41* | (2011.01) |
| *H04N 21/426* | (2011.01) |
| *H04N 21/4363* | (2011.01) |
| *G09G 3/00* | (2006.01) |
| *H04N 5/765* | (2006.01) |

(Continued)

(52) U.S. Cl.
CPC ............ *H04N 5/38* (2013.01); *G09G 5/006* (2013.01); *G09G 5/12* (2013.01); *H04N 5/775* (2013.01); *H04N 21/4122* (2013.01); *H04N 21/42646* (2013.01); *H04N 21/43632* (2013.01); *G09G 3/001* (2013.01); *G09G 2370/04* (2013.01); *G09G 2370/12* (2013.01); *H04N 5/765* (2013.01); *H04N 5/781* (2013.01); *H04N 5/85* (2013.01); *H04N 9/8042* (2013.01)

USPC ......... 348/723; 348/552; 348/606; 348/607; 348/625; 348/655; 348/683; 348/687

(58) Field of Classification Search
USPC ....... 348/552, 683, 687, 655, 625, 606, 607, 348/177, 180
See application file for complete search history.

(56) References Cited

U.S. PATENT DOCUMENTS

| | | | |
|---|---|---|---|
| 7,143,432 B1 | 11/2006 | Brooks et al. | |
| 7,394,499 B2* | 7/2008 | Okamoto et al. | 348/478 |

(Continued)

FOREIGN PATENT DOCUMENTS

| | | |
|---|---|---|
| JP | 2003517773 A | 5/2003 |
| JP | 2005-109703 A | 4/2005 |

(Continued)

OTHER PUBLICATIONS

United States Office Action for U.S. Appl. No. 14/178,823, dated Mar. 2, 2015.

*Primary Examiner* — Jefferey Harold
*Assistant Examiner* — Humam Satti
(74) *Attorney, Agent, or Firm* — Lerner, David, Littenberg, Krumholz & Mentlik, LLP

(57) ABSTRACT

A transmission apparatus includes: a video-signal transmission section transmitting a video signal to an external apparatus by a differential signal through a plurality of channels through a transmission line; and an information transmission section transmitting image-quality adjustment information corresponding to the video signal transmitted by the video-signal transmission section to the external apparatus through a communication path formed by a pair of differential transmission lines included in the transmission line.

7 Claims, 11 Drawing Sheets

(51) Int. Cl.
  *H04N 5/781*  (2006.01)
  *H04N 5/85*  (2006.01)
  *H04N 9/804*  (2006.01)

(56) References Cited

U.S. PATENT DOCUMENTS

| | | |
|---|---|---|
| 7,898,597 B2 * | 3/2011 | Urabe et al. .................. 348/555 |
| 8,375,147 B2 * | 2/2013 | Kamohara ........................ 710/3 |
| 2001/0047517 A1 | 11/2001 | Christopoulos et al. |
| 2005/0053159 A1 * | 3/2005 | Sugimoto ................ 375/240.26 |
| 2005/0068346 A1 * | 3/2005 | Ogawa et al. ................. 345/699 |
| 2006/0274204 A1 * | 12/2006 | Kimura et al. ............... 348/558 |
| 2007/0046697 A1 | 3/2007 | Hussain |
| 2007/0200961 A1 * | 8/2007 | Ohara ........................... 348/790 |
| 2007/0252746 A1 * | 11/2007 | Hoffert et al. ................ 341/158 |
| 2008/0084834 A1 | 4/2008 | Stanek |
| 2008/0143734 A1 * | 6/2008 | Ishii et al. .................... 345/581 |
| 2008/0225180 A1 * | 9/2008 | Callway et al. .............. 348/725 |
| 2008/0309822 A1 * | 12/2008 | Park .............................. 348/564 |
| 2009/0013095 A1 * | 1/2009 | Butcher ......................... 710/11 |
| 2009/0096933 A1 * | 4/2009 | Iijima .......................... 348/700 |
| 2009/0185637 A1 | 7/2009 | Mawatari et al. |
| 2010/0214480 A1 * | 8/2010 | Kitamori ....................... 348/554 |

FOREIGN PATENT DOCUMENTS

| | | |
|---|---|---|
| JP | 2009027601 A | 2/2009 |
| WO | WO-02/078336 A1 | 10/2002 |

* cited by examiner

FIG. 3

| IMAGE-QUALITY ADJUSTMENT INFORMATION \ THE CONTENTS OF CONTENT | ANIMATION | STILL IMAGE | SPORT | MOVIE |
|---|---|---|---|---|
| COLOR GAMUT | NTSC COLOR GAMUT | sRGB COLOR GAMUT | NTSC COLOR GAMUT | NTSC COLOR GAMUT |
| COLOR TEMPERATURE | HIGH | MEDIUM | MEDIUM | LOW |
| GAMMA CHARACTERISTIC | COMPRESSED AT LOW-LUMINANCE SIDE | COMPRESSED AT LOW-LUMINANCE SIDE | COMPRESSED AT LOW-LUMINANCE SIDE | EXPANDED AT LOW-LUMINANCE SIDE |

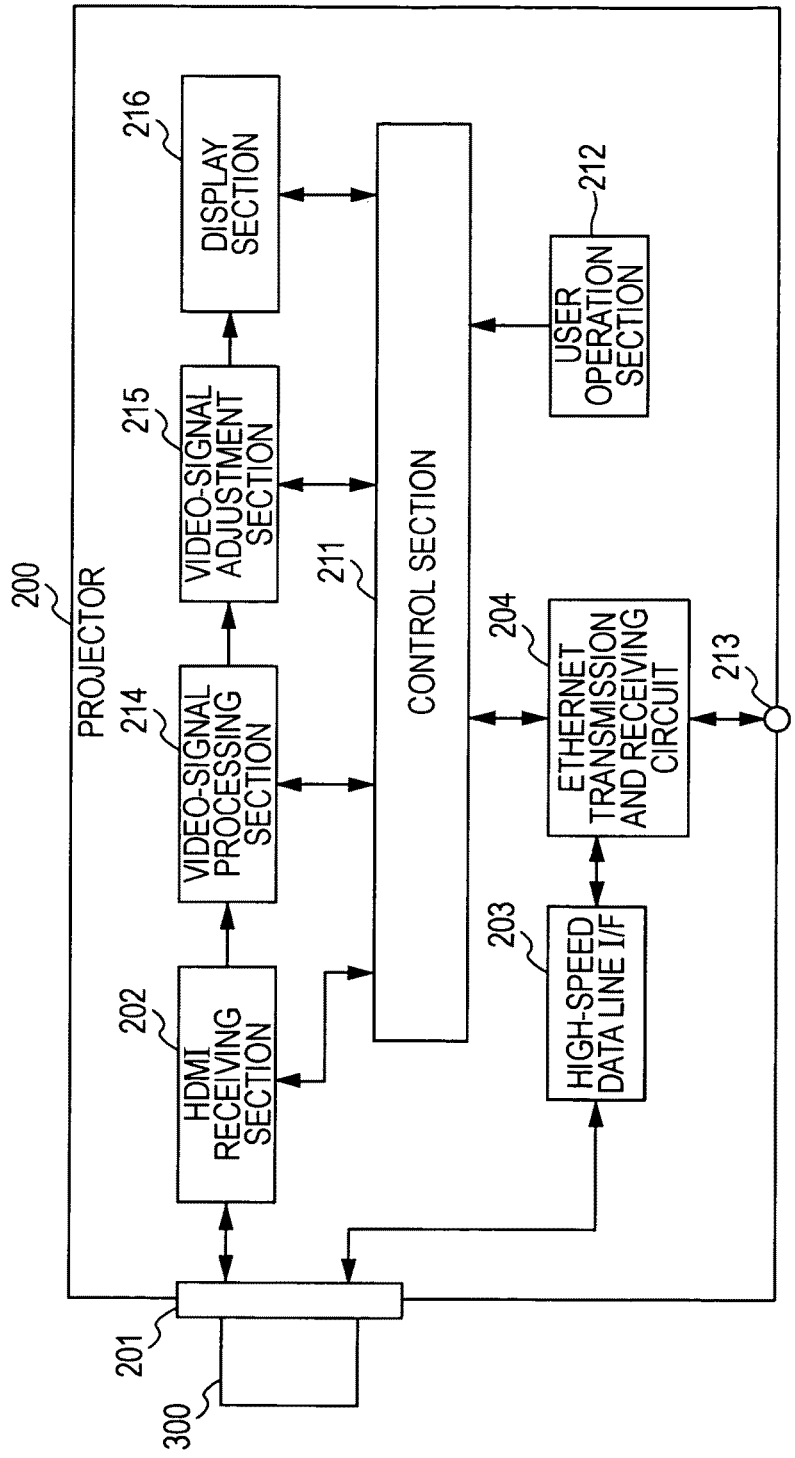

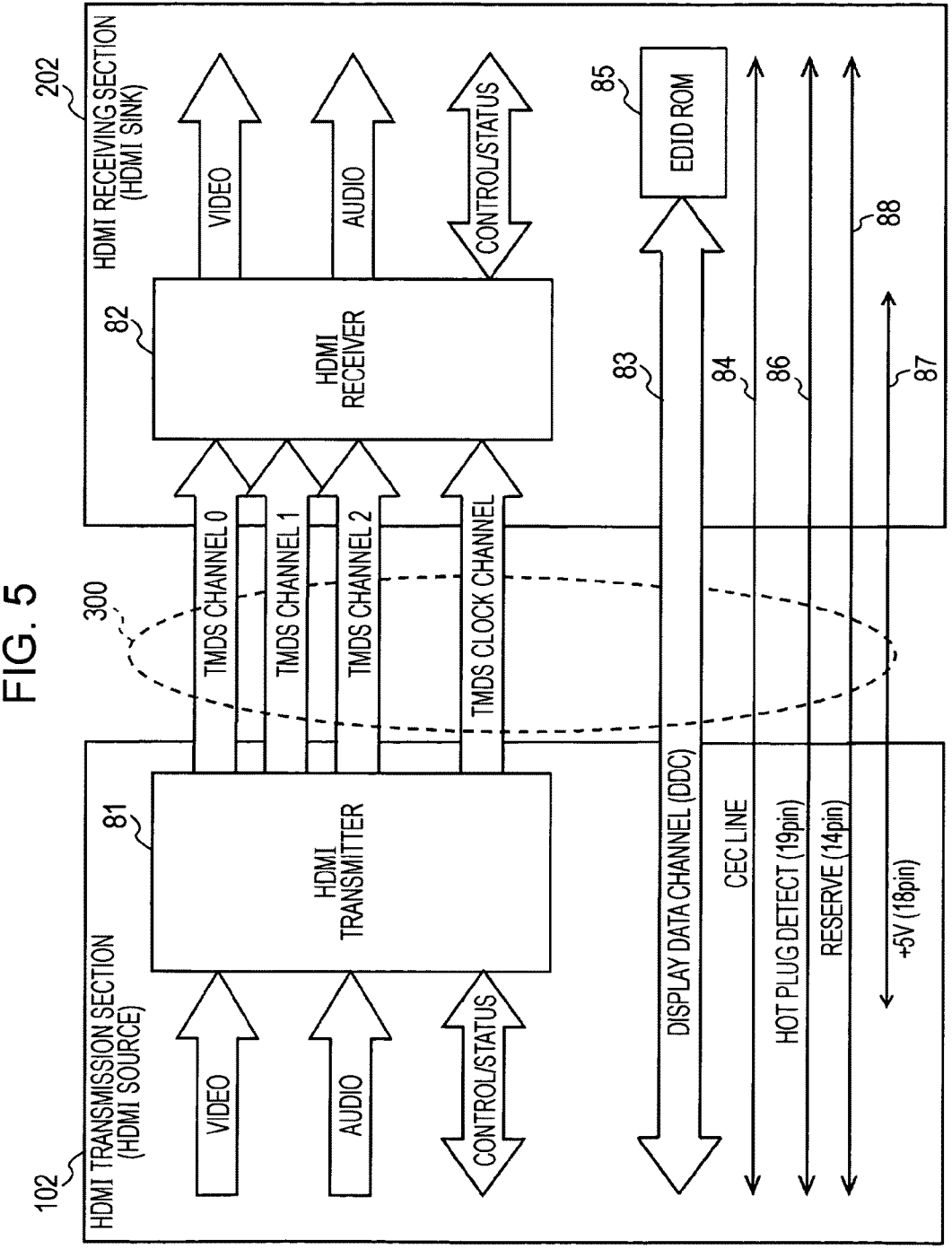

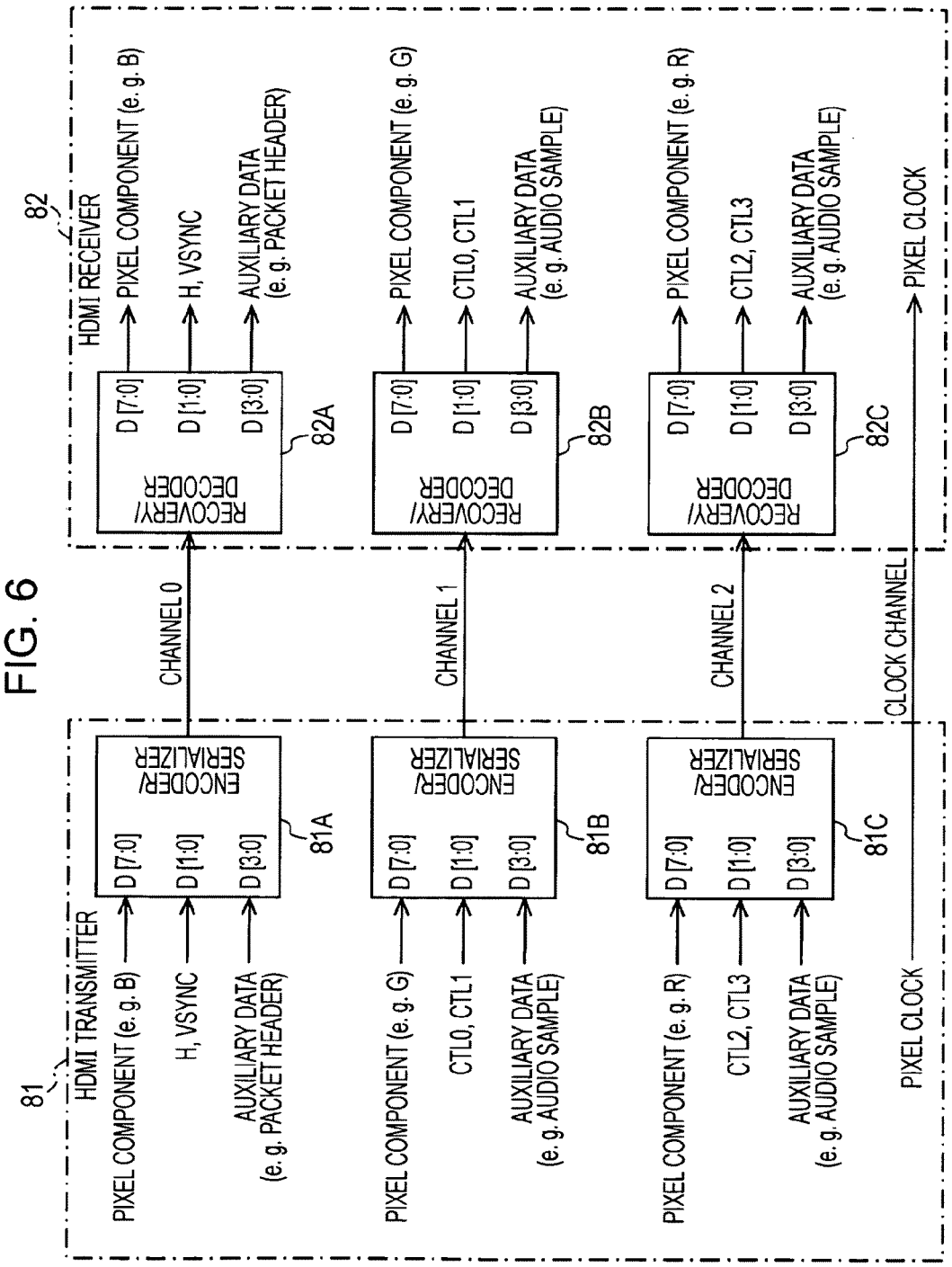

FIG. 8

| PIN | SIGNAL ASSIGNMENT |
|---|---|
| 1 | TMDS DATA2+ |
| 3 | TMDS DATA2− |
| 5 | TMDS DATA1 SHIELD |
| 7 | TMDS DATA0+ |
| 9 | TMDS DATA0− |
| 11 | TMDS CLOCK SHIELD |
| 13 | CEC |
| 15 | SCL |
| 17 | DDC/CEC GROUND |
| 19 | HOT PLUG DETECT |

| PIN | SIGNAL ASSIGNMENT |
|---|---|
| 2 | TMDS DATA2 SHIELD |
| 4 | TMDS DATA1+ |
| 6 | TMDS DATA1− |
| 8 | TMDS DATA0 SHIELD |
| 10 | TMDS CLOCK+ |
| 12 | TMDS CLOCK− |
| 14 | RESERVED (N. C. ON DEVICE) |
| 16 | SDA |
| 18 | +5V POWER |

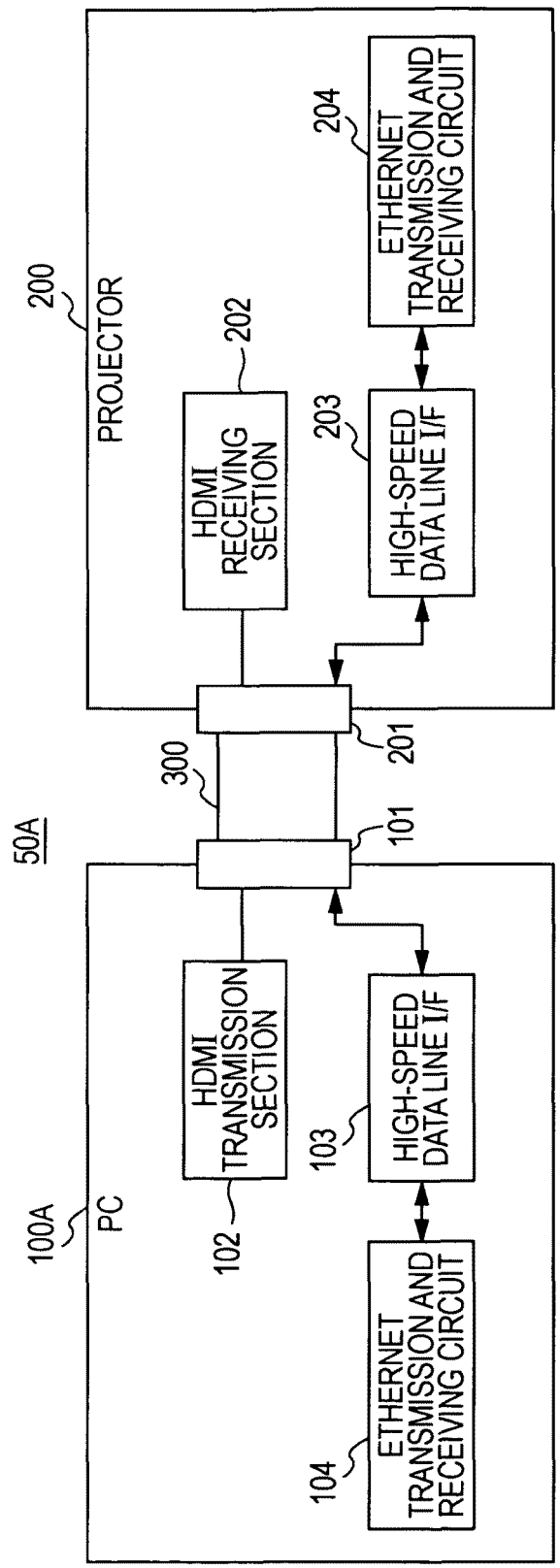

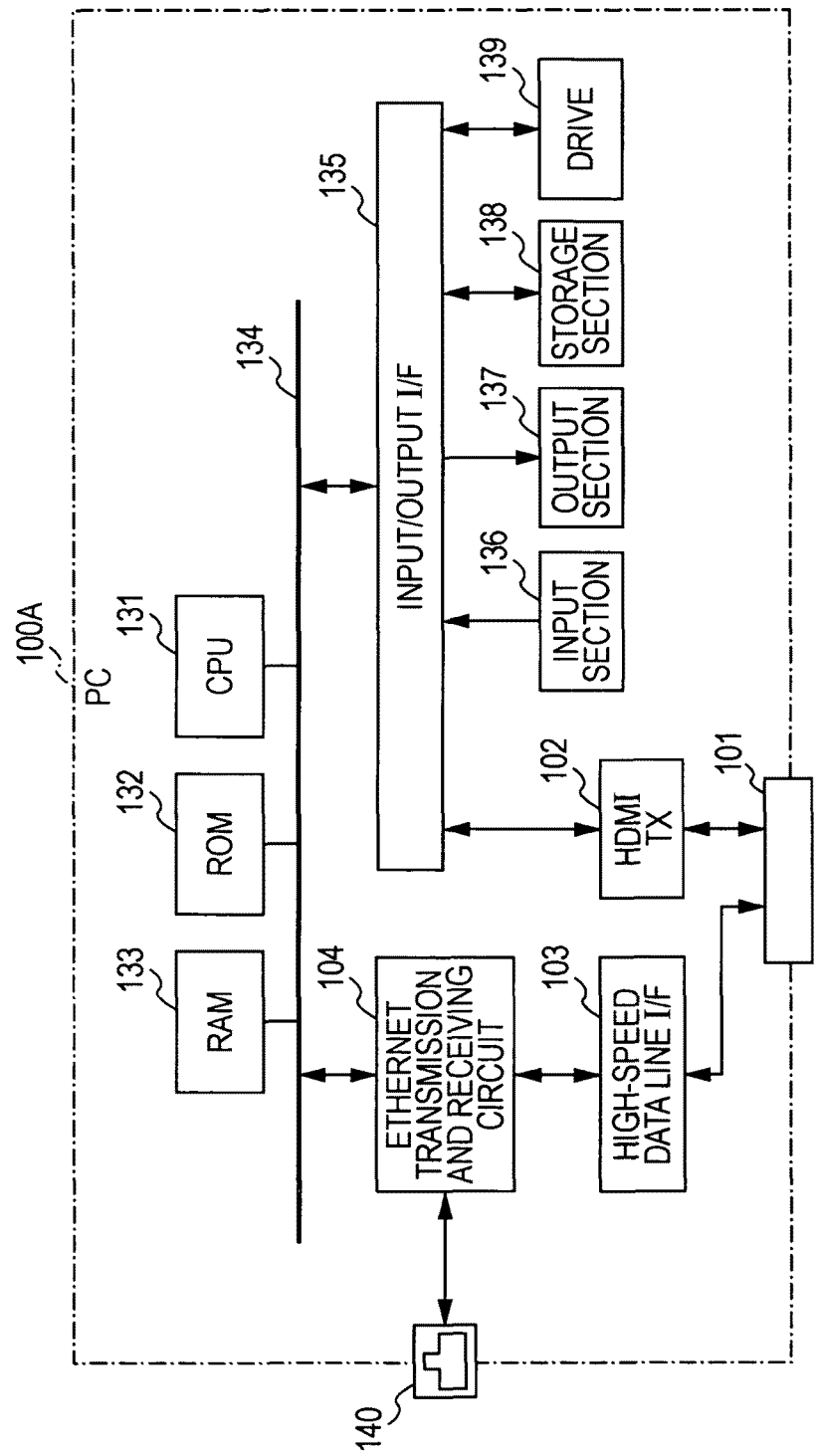

TRANSMISSION APPARATUS, DISPLAY APPARATUS, AND IMAGE DISPLAY SYSTEM

CROSS-REFERENCE TO RELATED APPLICATION

The present application claims priority from Japanese Patent Application No. JP 2009-095468 filed in the Japanese Patent Office on Apr. 10, 2009, the entire content of which is incorporated herein by reference.

BACKGROUND OF THE INVENTION

1. Field of the Invention

This invention relates to a transmission apparatus, a display apparatus, and an image display system. More particularly, this invention relates to a transmission apparatus, etc., suitably applied to an image display system, such as a projector system, and the like.

2. Description of the Related Art

To date, an image display system, in which a transmission apparatus transmits a video signal to a display apparatus, and an image is displayed on the display apparatus on the basis of the video signal, has been familiar. Here, the transmission apparatus includes, for example, a DVD (Digital Versatile Disc) recorder, a set-top box, and the other AV sources (Audio Visual sources). Also, the display apparatus includes, for example, a television receiver, a projector, and the other display units.

In recent years, in such an image display system, HDMI (High Definition Multimedia Interface) is being widespread as a communication interface transmitting an uncompressed digital video signal between a transmission apparatus and a display apparatus at a high speed. For example, WO2002/078336 Publication includes a detailed description on the HDMI standard.

SUMMARY OF THE INVENTION

In the above-described image display systems, a user is allowed to make an image-quality adjustment on a display apparatus, such as a television receiver, a projector, etc., and further, to carry out an aspect setting of a display image, on/off setting of noise reduction, etc.

Image-quality adjustment values set by a user in a display apparatus are optimum values of the case where a video signal from a transmission apparatus has specific contents of a content. Accordingly, if a video signal from a transmission apparatus has different contents of a content from the contents of a content at the time of image-quality adjustment, it becomes necessary for the user to carry out the setting of the image-quality adjustment values once again. For example, the contents of a content of a video signal includes a "movie", a "still image", an "animation", a "sport", etc.

Also, for example, if a video signal transmitted from a transmission apparatus to a display apparatus is an analog-broadcast video signal, it becomes difficult to reduce noise unless the user sets on the noise reduction of the display apparatus.

Also, for example, if a user carries out aspect setting of a display image in a display apparatus, unless the user matches an aspect of a transmission video signal in the transmission apparatus with a set aspect of the display apparatus, it becomes difficult to perform processing of thinning, scaling, etc., in the display apparatus.

Also, for example, if a user sets off noise reduction in a display apparatus, when the video signal is an analog-broadcast video signal and noise reduction processing is necessary, it becomes difficult to reduce noise unless the user sets on noise reduction in a transmission apparatus.

It is desirable to reduce user's time and effort for setting and to improve user-friendliness.

According to an embodiment of the present invention, there is provided a transmission apparatus including: a video-signal transmission section transmitting a video signal to an external apparatus by a differential signal through a plurality of channels through a transmission line; and an information transmission section transmitting image-quality adjustment information corresponding to the video signal transmitted by the video-signal transmission section to the external apparatus through a communication path formed by a pair of differential transmission lines included in the transmission line.

Also, according to another embodiment of the present invention, there is provided a display apparatus including: a video-signal receiving section receiving a video signal from an external apparatus by a differential signal through a plurality of channels through a transmission line; a signal processing section processing the video signal received by the video-signal receiving section; a display section displaying an image based on the video signal processed by the signal processing section; and an information transmission section transmitting setting information related to processing of the video signal in the signal processing section to the external apparatus through a communication path formed by a pair of differential transmission lines included in the transmission line.

In this invention, the transmission apparatus includes a video-signal transmission section transmitting a video signal to an external apparatus (display apparatus) by a differential signal through a plurality of channels through a transmission line. For example, the transmission apparatus is an HDMI source apparatus. The transmission apparatus is provided with an information transmission section transmitting image-quality adjustment information corresponding to the video signal transmitted by the video-signal transmission section to an external apparatus (display apparatus). In this case, the transmission of the image-quality adjustment information is performed through a communication path formed by a pair of differential transmission lines included in a transmission line. For example, the pair of differential transmission lines includes a reserved line and an HPD line forming an HDMI cable.

For example, the image-quality adjustment information may be information corresponding to the contents of a content of the video signal transmitted by the video-signal transmission section. For example, the contents of a content of the video signal includes a "movie", a "still image", an "animation", a "sport", etc. The image-quality adjustment information may include, for example, at least any one piece of information of a color gamut, a color temperature, and a gamma characteristic.

In this manner, the image-quality adjustment information transmitted by the information transmission section is output from the information output section on the basis of the contents of a content of the video signal, for example. Here, information on the contents of a content of the video signal is automatically obtained, for example, from meta data added to the video signal, or is input by the user from a user operation section. In this manner, with an input output section, if information on the contents of a content of the video signal is provided, it becomes possible to transmit the image-quality adjustment information corresponding to the video signal to the external apparatus. The information output section has, for example, a table indicating a relationship between the contents of a content and the image-quality adjustment information. By referring to the table, the image-quality adjustment information corresponding to the contents of a content is output.

Also, for example, the image-quality adjustment information is information indicating whether the video signal is an analog-broadcast video signal or not. In this case, the image-quality adjustment information may be information directly indicating whether the video signal is an analog-broadcast video signal or not, or may be information indirectly indicating whether the video signal is an analog-broadcast video signal of the receiving channel information, etc.

As described above, the image-quality adjustment information corresponding to the video signal transmitted from a transmission apparatus to an external apparatus (display apparatus) is transmitted from the transmission apparatus to the external apparatus. Thus, in the external apparatus, it is possible to automatically set the image-quality adjustment values matched with the transmitted video signal on the basis of the image-quality adjustment information. Thereby, it is possible to reduce time and effort of the user. In this case, the image-quality adjustment information is transmitted through a communication path including a pair of differential transmission lines included in a transmission line used for transmitting the video signal. Accordingly, it is not necessary to provide another cable, etc., for transmitting the image-quality adjustment information.

Also, a display apparatus includes a video-signal receiving section receiving a video signal from an external apparatus (transmission apparatus) by a differential signal through a plurality of channels through a transmission line, and is an HDMI sink apparatus, for example. The video signal received by the video-signal receiving section is processed by the signal processing section, and the image based on the processed video signal is displayed onto the display section. The display apparatus includes an information transmission section transmitting setting information related to processing of the video signal in the signal processing section to the external apparatus (transmission apparatus) through a communication path formed by a pair of differential transmission lines included in the above-described transmission line.

The setting information of the signal processing section is, for example, aspect-setting information of a display image. The signal processing section performs thinning processing and scaling processing so as to display an image having a set aspect onto the display section. Also, the setting information of the signal processing section is, for example, on/off-setting information of noise reduction.

As described above, setting information related to the signal processing is transmitted from the display apparatus to the external apparatus (transmission apparatus). Accordingly, in the external apparatus, it is possible to automatically change the processing on the video signal to be transmitted to the display apparatus on the basis of the setting information, and thereby it is possible to reduce time and effort of the user in the setting.

For example, if a user carries out aspect setting of a display image in a display apparatus, it is possible to automatically match the aspect of the transmission video signal with the set aspect of the display apparatus on the basis of the setting information in the external apparatus (transmission apparatus). Thereby, it becomes easy to per- form processing, such as thinning processing, scaling processing, etc., in the display apparatus. Also, for example, if the user carries out off-setting of noise reduction in the display apparatus, the external apparatus (transmission apparatus) automatically performs noise-reduction processing, for example, on an analog-broadcast video signal on the basis of the setting information, thereby reducing noise.

Also, the setting information related to the video-signal processing in the signal processing section is transmitted through a communication path including a pair of differential transmission lines included in a transmission line used for receiving a video signal. Thus, it is not necessary to provide another cable, etc., for transmitting the setting information of the signal processing section.

By the transmission apparatus according to this invention, it is possible to transmit the image-quality adjustment information, which is corresponding to the video signal transmitted to an external apparatus, to the external apparatus. Thus, in the external apparatus, it is possible to automatically change the setting of the image-quality adjustment values matched with the transmitted video signal on the basis of the image-quality adjustment information, and thereby it is possible to reduce time and effort of the user in the setting. Also, by the transmission apparatus according to this invention, the image-quality adjustment information is transmitted through a communication path including a pair of differential transmission lines included in a transmission line used for transmitting the video signal. Thus, it is not necessary to provide another cable, etc., for transmitting the image-quality adjustment information.

Also, by a display apparatus according to this invention, the setting information related to the video-signal processing is transmitted from the display apparatus to the external apparatus (transmission apparatus). Accordingly, in the external apparatus, it is possible to automatically change processing on the video signal to be transmitted to the display apparatus on the basis of the setting information in the signal processing section, and thereby it is possible to reduce time and effort of the user in the setting. Also, by a display apparatus according to this invention, the setting information of the signal processing section is transmitted through a communication path including a pair of differential transmission lines included in a transmission line used for receiving the video signal. Thus, it is not necessary to provide another cable, etc., for transmitting the setting information of the signal processing section.

BRIEF DESCRIPTION OF THE DRAWINGS

FIG. 3 is a diagram illustrating an example of a relationship table between a content description and image-quality adjustment information;

FIG. 4 is a block diagram illustrating an example of a configuration of a projector included in the image display system;

FIG. 5 is a block diagram illustrating an example of a configuration of an HDMI transmission section (HDMI source) and an HDMI receiving section (HDMI sink);

FIG. 6 is a block diagram illustrating an example of a configuration of an HDMI transmitter and an HDMI receiver;

FIG. 8 is a diagram illustrating a pin arrangement (type A) of an HDMI terminal;

FIG. 10 is a block diagram illustrating an example of a configuration of an image display system according to a second embodiment; and FIG. 11 is a block diagram illustrating an example of a configuration of a personal computer included in the image display system.

DESCRIPTION OF THE PREFERRED EMBODIMENTS

In the following, descriptions will be given of modes for carrying out the invention (hereinafter referred to as embodiments). In this regard, descriptions will be given in the following order.
1. First embodiment
2. Second embodiment
3. Variation

1. First Embodiment

Configuration of Image Display System

Figure 1:
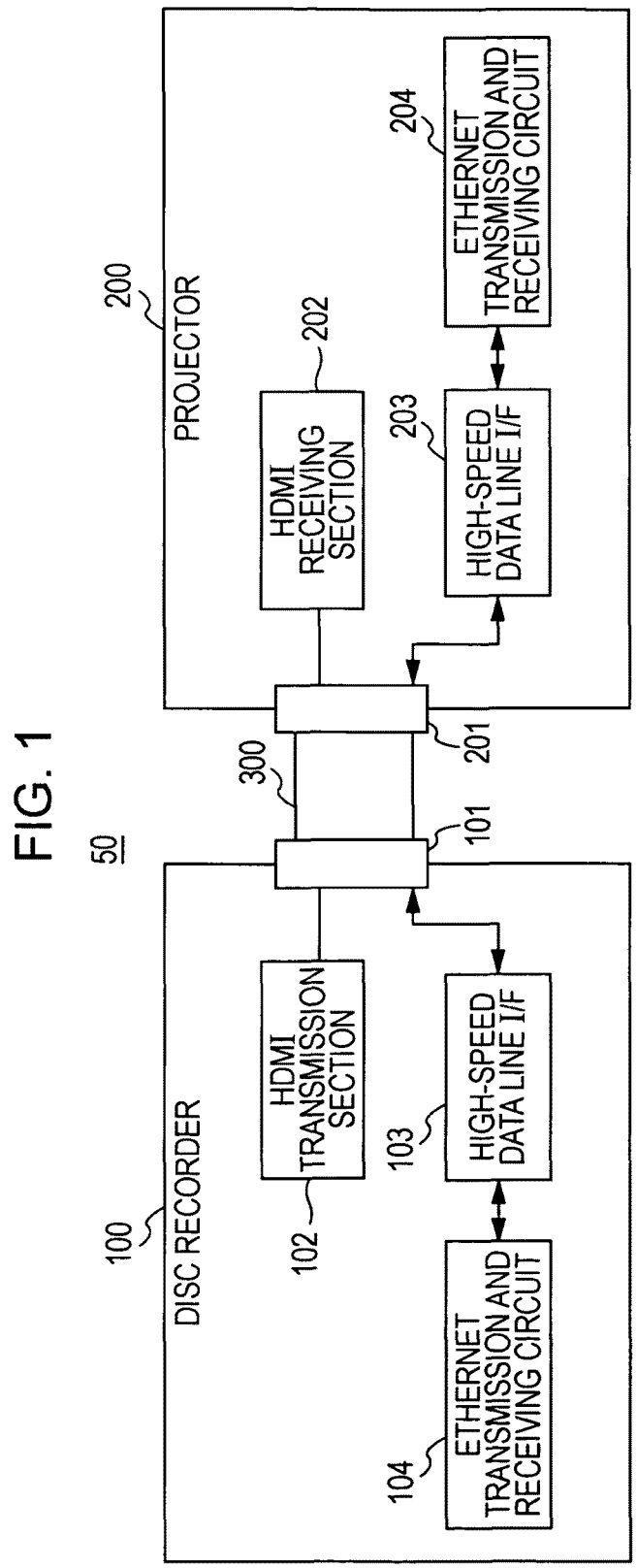
FIG. 1 is a block diagram illustrating an example of a configuration of an image display system according to a first embodiment.

FIG. 1 illustrates an example of a configuration of an image display system 50 according to a first embodiment. The image display system 50 includes a disc recorder 100 as a source apparatus, and a projector 200 as a sink apparatus. Here, the disc recorder 100 constitutes a transmission apparatus, and a projector 200 constitutes a display apparatus. In the image display system 50, the disc recorder 100 and the projector 200 are eHDMI-compatible apparatuses. Here, an eHDMI-compatible apparatus means that it is possible to perform communication using a communication path including a pair of differential transmission lines (for example, a reserve line and a HPD line) included in an HDMI cable.

The disc recorder 100 and the projector 200 are connected through an HDMI cable 300. Here, the HDMI cable 300 constitutes a transmission line. That is to say, the disc recorder 100 includes an HDMI terminal 101, and the projector 200 includes an HDMI terminal 201. One end of the HDMI cable 300 is connected to the HDMI terminal 101 of the disc recorder 100, and the other end of the HDMI cable 300 is connected to the HDMI terminal 201 of the projector 200.

The disc recorder 100 has an HDMI transmission section 102 and a high-speed data line interface (I/F) 103, which are connected to the HDMI terminal 101. An Ethernet transmission and receiving circuit 104 is connected to the high-speed data line I/F 103. The HDMI transmission section 102 transmits uncompressed (baseband) video (image) data and audio data from the HDMI terminal 101 by the communication conforming to the HDMI standard. The details of the HDMI transmission section 102 will be described later.

The high-speed data line I/F 103 interfaces an Ethernet signal transmitted through a communication path including a pair of differential transmission lines included in the HDMI cable 300 between the Ethernet transmission and receiving circuit 104 and the HDMI cable 300. The pair of differential transmission lines forming the communication path includes, for example, a reserved line and an HPD line included in the HDMI cable 300, as described later. The details of the high-speed data line I/F 103 will be described later. In this regard, "Ethernet" is a registered trademark.

The Ethernet transmission and receiving circuit 104 is a circuit for transmitting an Ethernet signal, and performs bi-directional communication conforming to the Internet Protocol (IP), for example. In this case, TCP (Transmission Control Protocol), or UDP (User Datagram Protocol) can be used as an upper layer of the Internet Protocol (IP).

The projector 200 has an HDMI receiving section 202 and a high-speed data line interface (I/F) 203, which are connected to the HDMI terminal 201. An Ethernet transmission and receiving circuit 204 is connected to the high-speed data line I/F 203. The HDMI transmission section 202 receives uncompressed (baseband) video (image) and audio data from the HDMI terminal 201 by the communication conforming to the HDMI standard. The details of the HDMI receiving section 202 will be described later.

In the same manner as the high-speed data line I/F 103 in the above-described disc recorder 100, the high-speed data line I/F 203 interfaces an Ethernet signal transmitted through the above-described communication path between the Ethernet transmission and receiving circuit 204 and the HDMI cable 300. The details of the high-speed data line I/F 203 will be described later. In the same manner as the Ethernet transmission and receiving circuit 104 of the above-described disc recorder 100, the Ethernet transmission and receiving circuit 204 is a circuit for transmitting an Ethernet signal, and performs bi-directional communication conforming to the Internet Protocol (IP), for example.

A description will be given of operation the image display system 50 shown in FIG. 1. The video and audio data to be transmitted from the disc recorder 100 to the projector 200 is transmitted from the HDMI transmission section 102 of the disc recorder 100 to the projector 200 through the HDMI cable 300 by the communication conforming to the HDMI standard. Also, the HDMI receiving section 202 of the projector 200 receives the video and audio data transmitted from the through the HDMI cable 300 by the communication conforming to the HDMI standard. The projector 200 performs image display and audio output by the received video and audio data.

Also, bi-directional communication conforming to the Internet Protocol (IP) is performed between the Ethernet transmission and receiving circuit 104 of the disc recorder 100 and the Ethernet transmission and receiving circuit 204 of the projector 200 through the HDMI cable 300.

In this embodiment, as described above, image-quality adjustment information corresponding to the video signal transmitted from the HDMI transmission section 102 to the HDMI receiving section 202 is sent from the Ethernet transmission and receiving circuit 104 to the Ethernet transmission and receiving circuit 204. In the projector 200, an image-quality adjustment value in the processing section of the receives video signal, not shown in the figure, is set to a value corresponding to the received video signal on the basis of the above-described image-quality adjustment information received by the Ethernet transmission and receiving circuit 204. Here, the Ethernet transmission and receiving circuit 104 constitutes the information transmission section, and the Ethernet transmission and receiving circuit 204 constitutes the information receiving section.

Also, in this embodiment, setting information related to the processing of a video signal in the video-signal processing section, not shown in the figure, in the projector 200 is sent from the Ethernet transmission and receiving circuit 204 to the Ethernet transmission and receiving circuit 104. In the disc recorder 100, the processing in the processing section of the transmission video signal, not shown in the figure, is changed on the basis of the setting information received by the Ethernet transmission and receiving circuit 104. Here, the Ethernet transmission and receiving circuit 204 constitutes the information transmission section, and the Ethernet transmission and receiving circuit 104 constitutes the information receiving section.

Configuration of Disc Recorder

Figure 2:
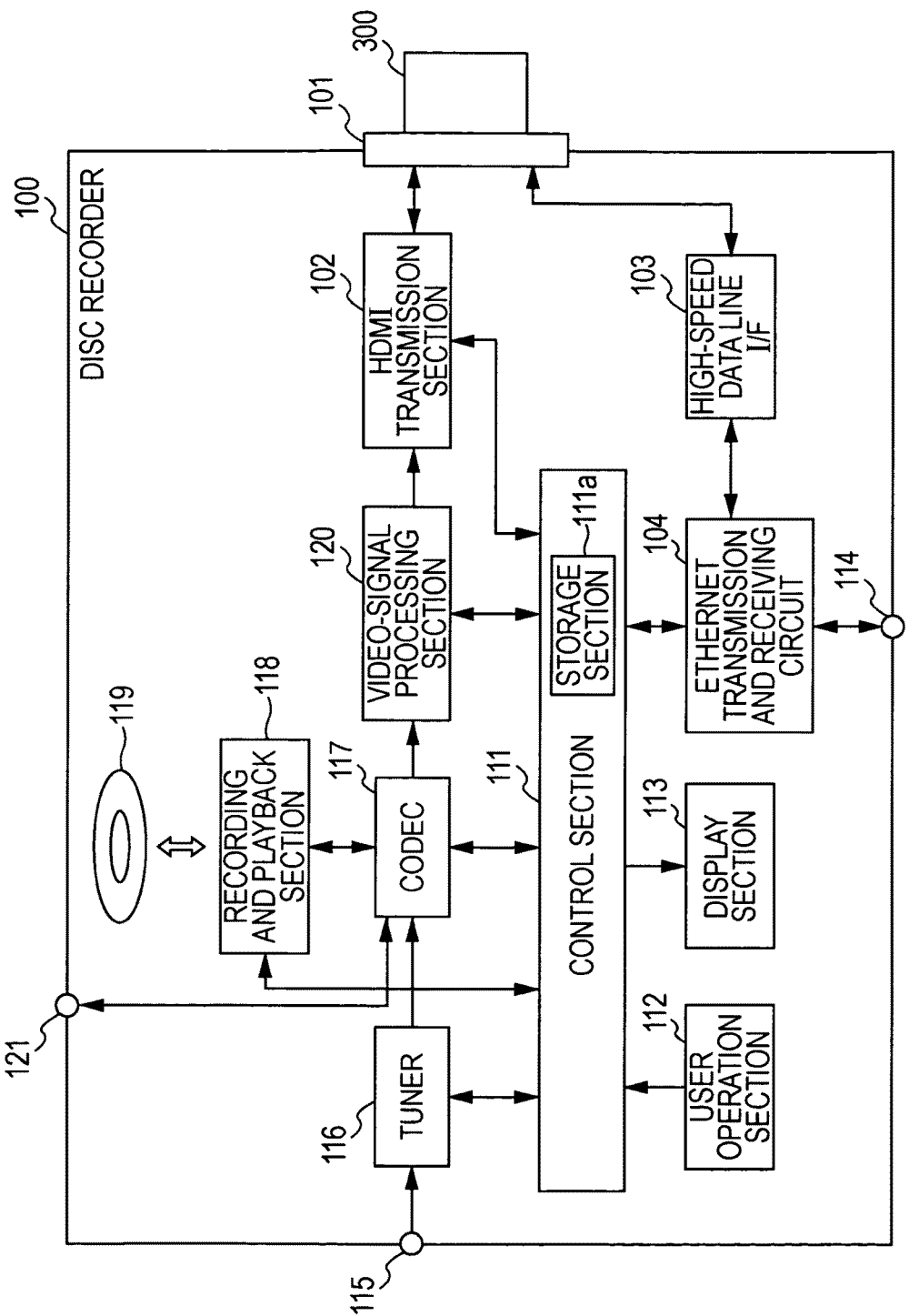
FIG. 2 is a block diagram illustrating an example of a configuration of a disc recorder included in the image display system.

FIG. 2 illustrates an example of a configuration of a disc recorder 100. The disc recorder 100 has an HDMI terminal 101, an HDMI transmission section 102, a high-speed data line I/F 103, and an Ethernet transmission and receiving circuit 104. Also, the disc recorder 100 has a control section 111, a user operation section 112, a display section 113, and a network terminal 114. Also, the disc recorder 100 has an antenna terminal 115, a tuner 116, a codec 117, a recording and playback section 118, and a video-signal processing section 120.

The control section 111 controls the operation of each section of the disc recorder 100. The user operation section 112 and the display section 113 constitute a user interface, and are connected to the control section 111. The user operation section 112 includes keys, buttons, dials disposed on a case of the disc recorder 100, not shown in the figure, or a touch panel disposed on a display surface of the display section 113, and further, a transmission and receiving apparatus of a remote controller, etc. The display section 113 includes an LCD (Liquid Crystal Display), etc.

The tuner 116 receives analog broadcasting and digital broadcasting on the basis of a broadcast signal captured by an antenna, not shown in the figure, connected to the antenna terminal 115. A user is allowed to set a receiving channel of the tuner 116, to set the contents of a content (genre) of the video signal to be received, etc., by operating the user operation section 112.

The recording and playback section 118 records encoded data supplied from the codec 117 in a recording medium 119. The encoded data is, for example, data obtained by encoding by the MPEG (Moving Picture Experts Group) system, etc. In this regard, the recording medium 119 is, for example, an HD (Hard Disk), a DVD (Digital Versatile Disc), a BD (Blu-ray Disc), etc. Also, the recording and playback section 118 plays back (reads) the encoded data from the recording medium 119, and supplies the data to the codec 117.

The codec 117 decodes the encoded data played back by the recording and playback section 118, obtains an uncompressed (baseband) video signal, and supplies the signal to an external apparatus, not shown in the figure, through the external terminal 121 as necessary. Also, the codec 117 encodes the uncompressed video signal supplied from the tuner 116 or the external terminal 121 into encoded data, and supplies the data to the recording and playback section 118. Here, the external apparatus is an HD recorder, a personal computer, a DVD (Digital Versatile Disc) player, a video camera, etc.

Also, when the codec 117 performs transmission using the HDMI interface, the codec 117 outputs the uncompressed video signal to the video-signal processing section 120. In this case, the uncompressed video signal is the uncompressed video signal supplied from the tuner 116 or the external terminal 121, or the uncompressed video signal obtained by decoding by the codec 117. The video-signal processing section 120 performs processing on the transmission video signal, such as aspect conversion processing, noise reduction processing, etc. The user is allowed to carry out aspect setting of the video-signal processing section 120, on/off setting of noise reduction, etc., by operating the user operation section 112.

The HDMI transmission section 102 transmits the uncompressed video signal processed by the video-signal processing section 120 to the projector 200 in one direction through the HDMI cable 300 by the communication conforming to HDMI. Here, the HDMI transmission section 102 constitutes a video-signal transmission section. The details of the HDMI transmission section 102 will be described later.

As described above, the high-speed data line I/F 103 is a bi-directional communication interface using a communication path including a pair of differential transmission lines (the reserved line and the HPD line) included in the HDMI cable 300. The high-speed data line I/F 103 is inserted between the Ethernet transmission and receiving circuit 104 connected to the control section 111 and the HDMI terminal 101.

The high-speed data line I/F 103 transmits the transmission data supplied from the control section 111 through the Ethernet transmission and receiving circuit 104 to the projector 200 through the HDMI terminal 101 and the HDMI cable 300. Also, the high-speed data line I/F 103 supplies the receive data received from the projector 200 through the HDMI cable 300 and the HDMI terminal 101 to the control section 111 through the Ethernet transmission and receiving circuit 104. The details of the high-speed data line I/F 103 will be described later.

In this regard, a network terminal 114 is connected to the Ethernet transmission and receiving circuit 104. The disc recorder 100 is allowed to be connected to an Ethernet network using the network terminal 114.

In this embodiment, as the transmission data transmitted from the disc recorder 100 to the projector 200, image-quality adjustment information corresponding to the transmission video signal from the HDMI transmission section 102 is provided. The control section 111 outputs the image-quality adjustment information corresponding to the transmission video signal to the Ethernet transmission and receiving circuit 104 to transmit the image-quality adjustment information to the projector 200.

As an example of the image-quality adjustment information, information corresponding to the contents of a content of the transmission video signal is provided. Here, the contents of a content of the video signal includes, for example, a "movie", a "still image", an "animation", a "sport", etc. Various kinds of information are thought to be the image-quality adjustment information. In this embodiment, the image-quality adjustment information includes information of a color gamut, a color temperature, and a gamma characteristic.

The control section 111 has a table, for example as shown in FIG. 3, indicating a relationship between the contents of a content and the image-quality adjustment information in an internal storage section 111a. The control section 111 outputs information of a color gamut, a color temperature, and a gamma characteristic, as image-quality adjustment information, to the Ethernet transmission and receiving circuit 104, as transmission data, by referring to this table on the basis of the information of the contents of a content of the transmission video signal. In this sense, the control section 111 constitutes an information output section outputting the image-quality adjustment information corresponding to the video signal on the basis of the contents of a content of the video signal.

A brief description will be given of a relationship between the contents of a content and the image-quality adjustment information shown in FIG. 3. For a color gamut, in the case of a "still image" content, an sRGB color gamut is ideal. However, in the case of a moving-image content, such as a "movie", etc., a wider NTSC color gamut is ideal. Thus, in the case of a "still image", the sRGB color gamut is used, and in the case of an "animation", a "sport", and a "movie", the NTSC color gamut is used.

For a color temperature (white balance), in the case of a light content, such as an "animation", etc., high color temperature is ideal, and in the case of a slightly dark content including a lot of human skins, such as a "movie", etc., a low color temperature is ideal. Accordingly, in the case of an "animation", a high color temperature is used, and in the case of a "movie", a low color temperature is used. In the case of a "still image" and a "sport", a medium color temperature is used.

For a gamma characteristic, in the case of a light content in which a black-side grayscale is not important, such as an "animation", a "still image", a "sport", etc., the gamma characteristic may fall at a low-luminance side. However, in a content in which a black-side grayscale is important, such as a "movie", etc., it is necessary to raise the gamma characteristic to a certain level at a low-luminance side. Accordingly, in an "animation", a "still image", and a "sport", a gamma characteristic whose low-luminance side is compressed is used, whereas in a "movie", a gamma characteristic whose low-luminance side is expanded is used.

In this regard, it is necessary for the control section 111 to obtain information on the contents of a content. For example, when the transmission video signal is a receive video signal from the tuner 116, or a playback video signal from the recording and playback section 118, if the information is included in the meta data added to the video signal, the information is automatically obtained from the meta data.

If the control section 111 fails to automatically obtain information of the contents of a content of a transmission video signal, the control section 111 is allowed to obtain information on the contents of a content of the transmission video signal by a user input from the user operation section 112. In this case, the control section 111 may display a message stating that information on the contents of a content of the transmission video signal has failed to be obtained onto the display section 113, and may urge the user to input the information.

The control section 111 transmits the information corresponding to the contents of a content of the above-described transmission video signal to the projector 200, for example, periodically or when the contents of a content of the transmission video signal is changed, etc. For example, as the case in which the contents of a content of the transmission video signal is changed, there is a case where the transmission video signal is a receive video signal from the tuner 116, and the receiving channel of the tuner 116 is changed.

Also, for example, as the case in which the contents of a content of the transmission video signal is changed, there is a case where the transmission video signal is a playback video signal from the recording and playback section 118, and the playback content is changed. Also, for example, as the case in which the contents of a content of the transmission video signal is changed, there is a case where the source (the tuner 116, the recording and playback section 118, or the external terminal 121) of the transmission video signal is changed.

In this regard, in a relationship between the contents of a content and the image-quality adjustment information, shown in FIG. 3, for example, a "movie" is expressed as one group. However, even within one movie, scenes are changed in various ways, such as a scene with motion, a still scene, a light scene, a dark scene, etc. Thus, for example, in a "movie", the contents of a content may further be divided, and the control section 111 may output information corresponding to the divided contents of a content for each scene, and may transmit the information to the projector 200.

As another example of the image-quality adjustment information, information indicating whether the transmission video signal is an analog-broadcast video signal or not is provided. In this case, the image-quality adjustment information may be information directly indicating whether the information is analog-broadcast video signal or not, or may be information indirectly indicating whether the information is analog-broadcast video signal, such as the receiving channel information, etc., of the tuner 116.

The control section 111 transmits information indicating whether the above-described transmission video signal is an analog-broadcast video signal or not to the projector 200, for example, periodically or when the contents of a content of the transmission video signal is changed, etc.

Also, in this embodiment, as receive data that the disc recorder 100 receives from the projector 200, setting information related to the video-signal processing in the projector 200 is provided. The control section 111 obtains the setting information related to the video-signal processing transmitted from the projector 200 from the Ethernet transmission and receiving circuit 104. As an example of the setting information, aspect-setting information of a display image is provided. Also, as another example of the setting information, on/off setting information of noise reduction is provided.

As described above, the control section 111 controls the operation of the video-signal processing section 120 on the basis of the setting information received from the projector 200. For example, if the received setting information is information of the aspect-setting information of the display image, the control section 111 controls the video-signal processing section 120 to match the aspect of the transmission video signal with the aspect of the display image. Also, for example, if the received setting information is information of noise-reduction off-setting information, and when the transmission video signal is an analog-broadcast video signal, the control section 111 controls the video-signal processing section 120 to perform noise reduction processing.

Configuration of Projector

FIG. 4 illustrates an example of a configuration of the projector 200. The projector 200 has an HDMI terminal 201, an HDMI receiving section 202, a high-speed data line I/F 203, an Ethernet transmission and receiving circuit 204. Also, the projector 200 has a control section 211, a user operation section 212, a network terminal 213, a video-signal processing section 214, a video-signal adjustment section 215, and a display section 216.

The control section 211 controls operation of each section of the projector 200. The user operation section 212 constitutes a user interface, and is connected to the control section 211. The user operation section 212 includes keys, buttons, dials disposed on a case of the projector 200, not shown in the figure, or a remote controller, etc.

The HDMI receiving section 202 receives the video signal transmitted from the disc recorder 100 in one direction through the HDMI cable 300 by the communication conforming to HDMI. Here, the HDMI receiving section 202 constitutes the video-signal receiving section. The details of the HDMI receiving section 202 will be described later.

As described above, the high-speed data line I/F 203 is a bi-directional communication interface using a communication path including a pair of differential transmission lines (the reserved line and the HPD line) included in the HDMI cable 300. The high-speed data line I/F 203 is inserted between the Ethernet transmission and receiving circuit 204 connected to the control section 211 and the HDMI terminal 201.

The high-speed data line I/F 203 transmits the transmission data supplied from the control section 211 through the Ethernet transmission and receiving circuit 204 to the disc recorder 100 through the HDMI terminal 201 and the HDMI cable 300. Also, the high-speed data line I/F 203 supplies the receive data received from the disc recorder 100 through the HDMI cable 300 and the HDMI terminal 201 to the control section 211 through the Ethernet transmission and receiving circuit 204. The details of the high-speed data line I/F 203 will be described later.

In this regard, a network terminal 213 is connected to the Ethernet transmission and receiving circuit 204. The projector 200 can be connected to an Ethernet network using the network terminal 213.

In this embodiment, as the transmission data transmitted from the projector 200 to the disc recorder 100, setting information related to receive-video signal processing is provided. The control section 211 outputs the setting information related to receive-video signal processing to the Ethernet transmission and receiving circuit 204 to transmit the setting information to the disc recorder 100. As described in the description of the above-described disc recorder 100, the setting information includes aspect-setting information of a display image, information of on/off setting of noise reduction, etc. The control section 211 transmits the above-described setting information to the disc recorder 100, for example, periodically or when the setting is changed, etc.

Also, in this embodiment, as receive data that the projector 200 receives from the disc recorder 100, there is image-quality adjustment information corresponding to the receive video signal from the HDMI receiving section 202. The control section 211 obtains, from the Ethernet transmission and receiving circuit 204, the image-quality adjustment information corresponding to the video signal transmitted from the disc recorder 100. As described in the above-described explanation of the disc recorder 100, the image-quality adjustment information is information corresponding to the contents of a content of the receive video signal (for example, information of a color gamut, a color temperature, and a gamma characteristic), information indicating whether the receive video signal is analog-broadcast video signal or not, etc.

As described above, the control section 211 controls operation of the video-signal processing section 214 and the video-signal adjustment section 215 on the basis of the image-quality adjustment information received from the disc recorder 100. For example, if information corresponding to the contents of a content of the receive video signal is received, image-quality adjustment values, such as a color gamut, a color temperature, a gamma characteristic, etc., of the video-signal processing section 214 and the video-signal adjustment section 215 are set to the values corresponding to the contents of a content of the receive video signal. And the video-signal adjustment section 215 performs image-quality adjustment corresponding to the contents of a content thereof on the receive video signal. Also, for example, if information indicating whether the receive video signal is analog-broadcast video signal or not is received, the control section 211 controls the video-signal processing section 214 to perform noise-reduction processing.

The video-signal processing section 214 processes the receive video signal received by the HDMI receiving section 202. The video-signal processing section 214 performs, for example, thinning processing, scaling processing, etc., on the receive video signal in accordance with the aspect setting of the display image. In this regard, a user is allowed to carry out aspect setting of display images by operation of the user-operation section 212. For example, the user is allowed to carry out aspect setting using a GUI screen displayed on the display section 216.

Also, the video-signal processing section 214 performs, for example, gamma characteristic processing on the receive video signal. In this regard, the gamma characteristic processing is also performed by the video-signal adjustment section 215 as described later. The gamma characteristic is determined in the video-signal processing section 214 and the video-signal adjustment section 215 on the basis of the gamma characteristic processing. The gamma characteristic processing of the video-signal processing section 214 is varied by changing the table setting of the gamma characteristic. Also, the video-signal processing section 214 performs, for example, noise-reduction processing on the receive video signal.

The video-signal adjustment section 215 performs color-gamut processing, color-temperature processing, and gamma-characteristic processing on the receive image signal processed by the video-signal processing section 214. The video-signal adjustment section 215 performs each processing on the basis of the image-quality adjustment values of the set color gamut, color temperature, and gamma characteristic. In this regard, the user is allowed to set the image-quality adjustment values of the color gamut, the color temperature, and the gamma characteristic by the operation of the user-operation section 212. For example, the user is allowed to set image-quality adjustment values of the color gamut, color temperature, and gamma characteristic using the GUI screen displayed on the display section 216.

The display section 216 displays an image on the basis of the receive video signal having been subjected to the image-quality adjustment by the video-signal adjustment section 215. The display section 216 includes, for example, an LCD (Liquid Crystal Display), a CRT (Cathode Ray Tube), a LCOS (Liquid Crystal On Silicon), etc.

Configuration of HDMI Transmission Section and HDMI Receiving Section

Next, a description will be given of configurations of the HDMI transmission section 102 of the disc recorder 100 and the HDMI receiving section 202 of the projector 200. FIG. 5 illustrates an example of a configuration of the HDMI transmission section (HDMI source) 102 and the HDMI receiving section (HDMI sink) 202.

The HDMI transmission section 102 transmits a differential signal corresponding to pixel data (video signal) of one-screen uncompressed image in an active picture period (hereinafter may also be referred to as an active video period appropriately) to the HDMI receiving section 202 in one direction through a plurality of channels. Here, an active video period is a period produced by eliminating a horizontal retrace period and a vertical retrace period from a period from a certain vertical synchronization signal to the next vertical synchronization signal. Also, the HDMI transmission section 102 transmits at least differential signals corresponding to audio data, control data, and the other auxiliary data, etc., attached to the image to the HDMI receiving section 202 in one direction through a plurality of channels in a horizontal retrace period or a vertical retrace period.

That is to say, the HDMI transmission section 102 has a transmitter 81. The transmitter 81, for example, converts pixel data of an uncompressed image into the corresponding differential signal, and serially transmits the signal to the HDMI receiving section 202 in one direction through three TMDS channels #0, #1, and #2, which are a plurality of channels. Also, the transmitter 81 converts audio data attached to the uncompressed image, and further, necessary control data, the other auxiliary data, etc., into the corresponding differential signal, and transmits the signal to the HDMI receiving section 202 in one direction through the three TMDS channels #0, #1, and #2.

Further, the transmitter 81 transmits a pixel clock to the HDMI receiving section 202 through a TMDS clock channel in synchronism with the pixel data transmitted through the three TMDS channels #0, #1, and #2. Here, the 10-bit pixel data is transmitted through one TMDS channel #i (i=0, 1, and 2) during one-clock period of the pixel clock.

The HDMI receiving section 202 receives the differential signal corresponding to the pixel data which is transmitted in one way from the HDMI transmission section 102 in the active video period through a plurality of channels. Also, the HDMI receiving section 202 receives the differential signal corresponding to the audio data and the control data that are transmitted in one direction from the HDMI transmission section 102 in a horizontal retrace period or a vertical retrace period through a plurality of channels.

That is to say, the HDMI receiving section 202 has a receiver 82. The receiver 82 receives the differential signal corresponding to the pixel data, the audio data, and the control data that are transmitted through the TMDS channels #0, #1, and #2 in synchronism with the pixel clock that is transmitted through the TMDS clock channel.

The transmission channels of the HDMI system includes transmission channels called a DDC (Display Data Channel) 83 and a CEC line 84 in addition to the above-described TMDS channel and TMDS clock channel. The CEC line is formed by one signal line, not shown in the figure, included in the HDMI cable 300. The CEC line 84 is used for performing bi-directional communication of the control data between the HDMI transmission section 102 and the HDMI receiving section 202.

The DDC 83 is formed by two signal lines, not shown in the figure, included in the HDMI cable 300. The DDC 83 is used for the HDMI transmission section 102 to read E-EDID (Enhanced Extended display Identification Data) from the HDMI receiving section 202.

The HDMI receiving section 202 has an EDID ROM 85 storing an E-EDID, which is performance information on its own performance (configuration/capability), in addition to the HDMI receiver 82. The HDMI transmission section 102 reads the E-EDID from the HDMI receiving section 202 through the DDC 83. And the HDMI transmission section 102 recognizes, for example, the image format (profile) supported by the projector 200 having the HDMI receiving section 202, for example, RGB, YCbCr 4:4:4, YCbCr 4:2:2, etc., on the basis of the E-EDID.

Also, the HDMI cable 300 includes an HPD (Hot Plug Detect) line 86. The source apparatus can detect the connection of a sink apparatus using the HPD line 86. Also, the HDMI cable 300 includes a power-source line 87 used for supplying power from the source apparatus to the sink apparatus. Further, the HDMI cable 300 includes a reserved line 88.

FIG. 6 illustrates an example of a configuration of the HDMI transmitter 81 and the HDMI receiver 82 in FIG. 5.

The transmitter 81 has three encoders/serializers 81A, 81B, and 81C corresponding to the three TMDS channels #0, #1, and #2, respectively. The encoders/serializers 81A, 81B, and 81C individually encode the image data, the auxiliary data, and the control data that are supplied thereto, converts the parallel data into serial data, and transmits the data by differential signals. Here, if the image data has, for example, three components, R (Red), G (Green), B (Blue), the B component is supplied to the encoder/serializer 81A, the G component is supplied to the encoder/serializer 81B, and the R component is supplied to the encoder/serializer 81C.

Also, the auxiliary data includes, for example, audio data and a control packet. The control packet is, for example, supplied to the encoder/serializer 81A. The audio data is supplied to the encoder/serializer 81B and 81C. Further, the control data includes a one-bit vertical synchronization signal (VSYNC), a one-bit horizontal synchronization signal (HSYNC), and individually one-bit control bits CTL0, CTL1, CTL2, and CTL3. The vertical synchronization signal and the horizontal synchronization signal are supplied to the encoder/serializer 81A. The control bits CTL0 and CTL1 are supplied to the encoder/serializer 81B, and the control bits CTL2 and CTL3 are supplied to the encoder/serializer 81C.

The encoder/serializer 81A transmits the B component of the image data, the vertical synchronization signal, the horizontal synchronization signal, and the auxiliary data, which is supplied thereto, in time division. That is to say, the encoder/serializer 81A changes the B component of the image data supplied thereto into parallel data having a fixed number of bits, namely 8-bit units. Further, the encoder/serializer 81A encodes the parallel data, converts the data into serial data, and transmits the data through the TMDS channel #0.

Also, the encoder/serializer 81A encodes 2-bit parallel data of the vertical synchronization signal and the horizontal synchronization signal, which are supplied thereto, into serial data, and transmits the data through the TMDS channel #0. Further, the encoder/serializer 81A changes the auxiliary data, which is supplied thereto, into 4-bit parallel data. And the encoder/serializer 81A encode the parallel data, converts the data into serial data, and transmits the data through the TMDS channel #0.

The encoder/serializer 81B transmits G component of the image data, the control bits CTL0 and CTL1, and auxiliary data, which are supplied thereto, in time division. That is to say, the encoder/serializer 81B changes the G component of the image data, which is supplied thereto, into parallel data having a fixed number of bits, namely 8-bit units. Further, the encoder/serializer 81B encodes the parallel data, converts the data into serial data, and transmits the data through the TMDS channel #1.

Also, the encoder/serializer 81B encodes the 2-bit parallel data, control bits CTL0 and CTL1, which are supplied thereto, converts the data into serial data, and transmits the data through the TMDS channel #1. Further, the encoder/serializer 81B changes the auxiliary data supplied thereto into 4-bit parallel data. And the encoder/serializer 81B encodes the parallel data, converts the data into serial data, and transmits the data through the TMDS channel #1.

The encoder/serializer 81C transmits R component of the image data, the control bits CTL2 and CTL3, and auxiliary data, which are supplied thereto, in time division. That is to say, the encoder/serializer 81C changes R component of the image data, which is supplied thereto, into parallel data having a fixed number of bits, namely 8-bit units. Further, the encoder/serializer 81C encodes the parallel data, converts the data into serial data, and transmits the data through the TMDS channel #2.

Also, the encoder/serializer 81C encodes the 2-bit parallel data, control bits CTL2 and CTL3, which are supplied thereto, converts the data into serial data, and transmits the data through the TMDS channel #2. Further, the encoder/serializer 81C changes the auxiliary data supplied thereto into 4-bit parallel data. And the encoder/serializer 81C encodes the parallel data, converts the data into serial data, and transmits the data through the TMDS channel #2.

The receiver 82 has three recovery/decoders 82A, 82B, and 82C corresponding to three TMDS channels #0, #1, and #2, respectively. And the recovery/decoders 82A, 82B, and 82C individually receive the image data, the auxiliary data, and the control data transmitted by differential signals through the TMDS channels #0, #1, and #2, respectively. Further, the recovery/decoder 82A, 82B, and 82C convert the image data, the auxiliary data, and the control data, respectively, from serial data to parallel data, and further decode and output the data.

That is to say, the recovery/decoder 82A receives the B component of the image data, the vertical synchronization signal, the horizontal synchronization signal, and the auxiliary data, which are transmitted by the differential signal through the TMDS channel #0. And the recovery/decoder 82A converts the B component of the image data, the vertical synchronization signal, the horizontal synchronization signal, and the auxiliary data from serial data into parallel data, and decodes and outputs the data.

The recovery/decoder 82B receives the G component of the image data, the control bits CTL0 and CTL1, and the auxiliary data, which are transmitted by the differential signal through the TMDS channel #1. And the recovery/decoder 82B converts the G-component of the image data, the control bits CTL0 and CTL1, and the auxiliary data from serial data into the parallel data, and decodes and outputs the data.

The recovery/decoder 82C receives the R component of the image data, the control bits CTL2 and CTL3, and the auxiliary data, which are transmitted by the differential signal through the TMDS channel #2. And the recovery/decoder 82C converts the R-component of the image data, the control bits CTL2 and CTL3, and the auxiliary data from serial data into the parallel data, and decodes and outputs the data.

Figure 7:
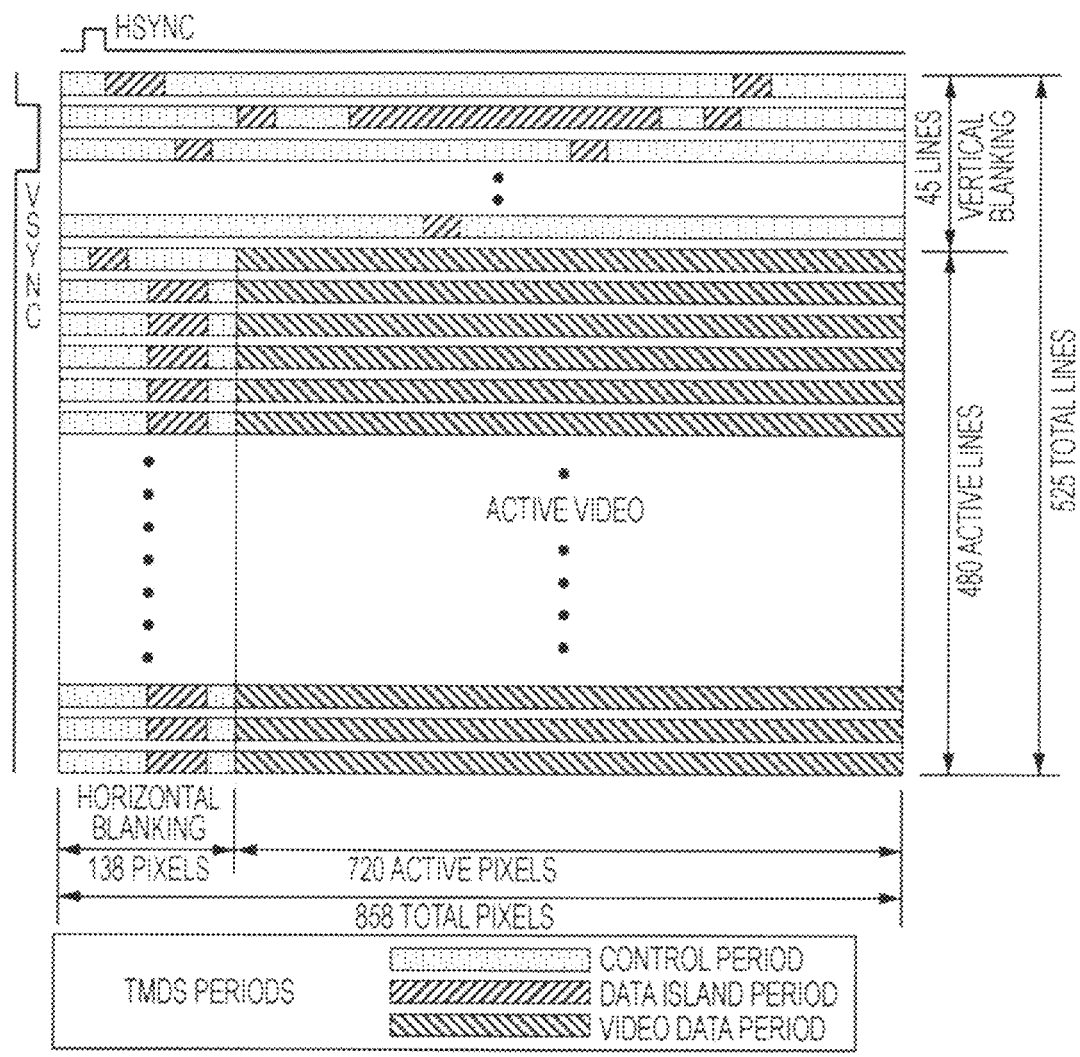
FIG. 7 is a diagram illustrating a structure of a TMDS transmission data.

FIG. 7 illustrates an example of a transmission section (period) in which various kinds of transmission data is transmitted through the three HDMI TMDS channels #0, #1, and #2. In this regard, FIG. 7 illustrates various kinds of transmission data sections in the case of transmitting a progressive screen having 720 pixels laterally×480 pixels vertically through the TMDS channels #0, #1, and #2.

The video field of the transmission data transmitted through three HDMI TMDS channels #0, #1, and #2 includes three kinds of periods, namely, a video data period, a data island period, and a control period depending on the kinds of transmission data.

Here, the video field period is a period from a rise edge (active edge) of a vertical synchronization signal to a rise edge of the next vertical synchronization signal. The video field period is allocated to a horizontal blanking period, a vertical blanking period, and an active video period. The active video period is a period produced by removing the horizontal blanking period and the vertical blanking period from the video field period.

The video data period is allocated to an active video period. In the video data period, active pixel data for 720 pixels×480 lines, which forms uncompressed image data for 1 screen, is transmitted. The data island period and the control period are allocated to the horizontal blanking period and the vertical blanking period. In the data island period and the control period, auxiliary data is transmitted. That is to say, the data island period is allocated to a part of both the horizontal blanking period and the vertical blanking period.

In the data island period, data that is not related to control out of auxiliary data, for example, audio data packets, etc., is transmitted. The control period is allocated to the other part of both the horizontal blanking period and the vertical blanking period. In the control period, data related to control, out of auxiliary data, for example, the vertical synchronization signal and the horizontal synchronization signal, the control packet, etc., are transmitted. Here, in the current HDMI, the frequency of the pixel clock transmitted through the TMDS clock channel is, for example, 165 MHz, and the transmission rate of the data island period is about 500 Mbps.

FIG. 8 illustrates a pin arrangement of HDMI terminals 101 and 201. This pin arrangement is an example of type-A.

The two lines through which TMDS Data #i+ and TMDS Data #i−, which are differential signals of the TMDS channel #i, are transmitted, respectively, are connected to a pin to which TMDS Data #i+ is allocated (pins having a pin-number of 1, 4, and 7) and a pin to which TMDS Data #i− is allocated (pins having a pin-number of 3, 6, and 9), respectively.

Also, the CEC line 84 through which the CEC signal, which is control data, is connected to a pin having pin number of 13. A pin having a pin number 14 is a reserved pin. Also, a line on which an SDA (SerialData) signal, such as E-EDID, etc., is transmitted is connected to a pin having a pin number 16. A line on which an SCL (Serial Clock) signal, which is a clock signal used for synchronization at the time of transmitting and the receiving of the SDA signal, is connected to a pin having a pin number 15.

Also, the above-described DDC 83 includes a line on which the SDA signal is transmitted and a line on which the SCL signal is transmitted. Also, as described above, an HPD line 86 used for a source apparatus to detect a connection of a sink apparatus is connected to a pin having a pin number 19. Also, as described above, a power line 87 for supplying power is connected to a pin having a pin number 18.

Configuration of High-Speed Data Line I/F

Next, descriptions will be given of a configuration of the high-speed data line I/F 103 of the disc recorder 100 and the high-speed data line I/F 203 of the projector 200. In this regard, here, the descriptions will be given on the assumption that the disc recorder 100 is a source apparatus, and the projector 200 is a sink apparatus.

Figure 9:
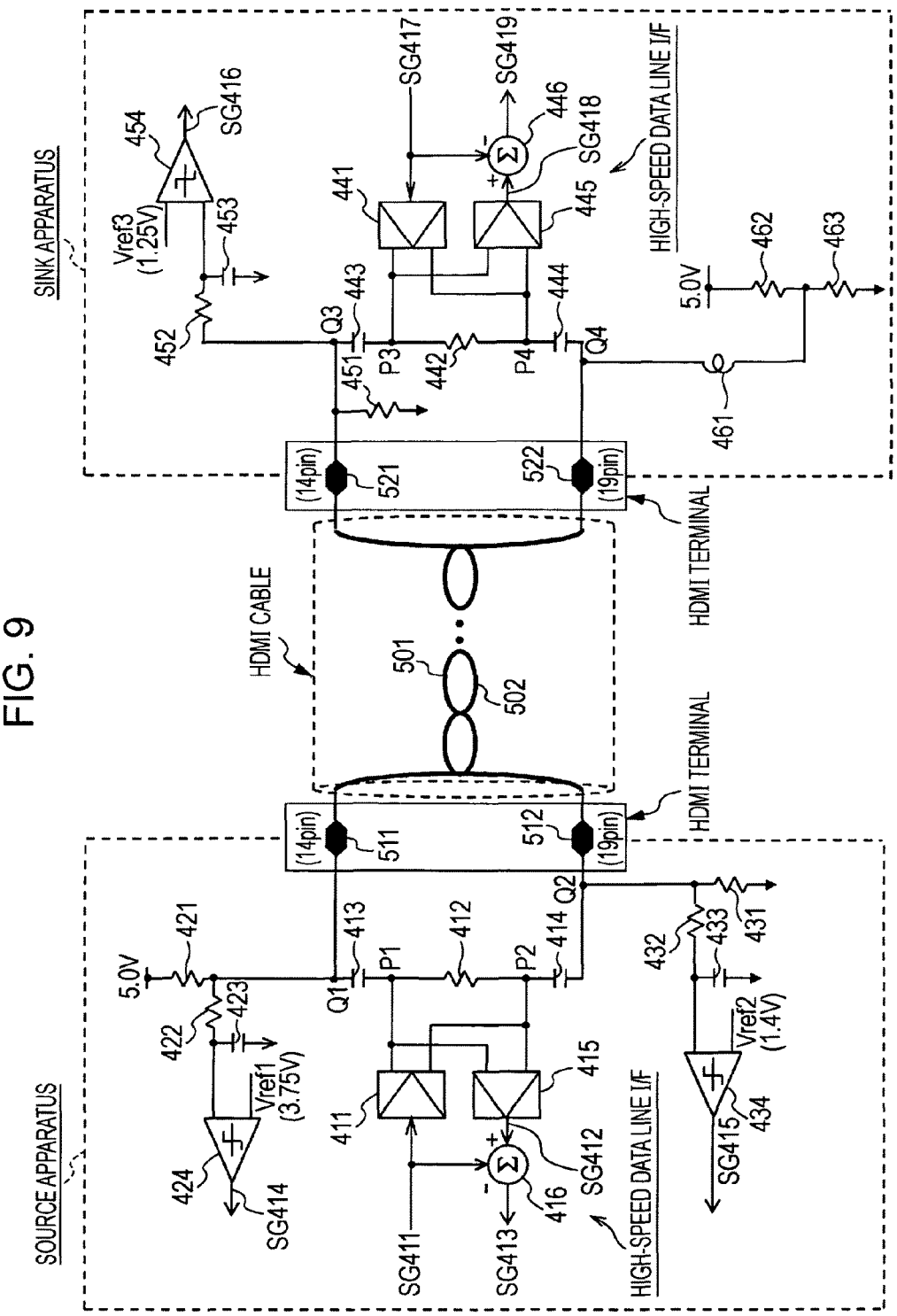
FIG. 9 is a connection diagram illustrating an example of a configuration of a communication section performing LAN communication between a source apparatus and a sink apparatus.

FIG. 9 illustrates an example of a configuration of a high-speed data line I/F between a source apparatus and a sink apparatus. The high-speed data line I/F forms a communication section performing LAN (Local Area Network) communication. The communication section performs communication using a bi-directional communication path including a pair of differential transmission lines included in an HDMI cable. In this embodiment, a pair of differential transmission lines are formed by a reserved line and an HPD line included in an HDMI cable.

The source apparatus has a LAN-signal transmission circuit 411, a terminating resistor 412, AC coupling capacitors 413 and 414, a LAN-signal receiving circuit 415 and a subtraction circuit 416. Also, the source apparatus has a pull-up resistor 421, a resistor 422 and a capacitor 423 forming a low-pass filter, a comparator 424, a pull-down resistor 431, a resistor 432 and a capacitor 433 forming a low-pass filter, and a comparator 434. Here, a high-speed data line I/F includes a LAN-signal transmission circuit 411, a terminating resistor 412, AC coupling capacitors 413 and 414, a LAN-signal receiving circuit 415, and a subtraction circuit 416.

A series circuit of a pull-up resistor 421, an AC coupling capacitor 413, a terminating resistor 412, an AC coupling capacitor 414 and a pull-down resistor 431 is connected between the power line (+5.0V) and the ground line. The mutual connection point P1 of the AC coupling capacitor 413 and the terminating resistor 412 is connected to a positive output side of the LAN-signal transmission circuit 411, and a positive input side of the LAN-signal receiving circuit 415. Also, the mutual connection point P2 of the AC coupling capacitor 414 and the terminating resistor 412 is connected to a negative output side of the LAN-signal transmission circuit 411, and a negative input side of the LAN-signal receiving circuit 415. A transmission signal (transmission data) SG411 is supplied to the input side of the LAN-signal transmission circuit 411.

Also, an output signal SG412 of the LAN-signal receiving circuit 415 is supplied to a positive-side terminal of the subtraction circuit 416, and a transmission signal (transmission data) SG411 is supplied to a negative-side terminal of the subtraction circuit 416. In the subtraction circuit 416, the transmission signal SG411 is subtracted from the output signal SG412 of the LAN-signal receiving circuit 415, and thereby a receive signal (receive data) SG413 is obtained.

Also, the mutual connection point Q1 of a pull-up resistor 421 and an AC coupling capacitor 413 is connected to a ground line through a series circuit of a resistor 422 and a capacitor 423. And an output signal of the low-pass filter obtained at the mutual connection point of the resistor 422 and the capacitor 423 is supplied to one of input terminals of a comparator 424. The comparator 424 compares the output signal of the low-pass filter and a reference voltage Vref1 (+3.75 V) supplied to the other of the input terminals. The output signal SG414 of the comparator 424 is supplied to the control section (CPU) of the source apparatus.

Also, the mutual connection point Q2 of an AC coupling capacitor 414 and a pull-down resistor 431 is connected to a ground line through a series circuit of a resistor 432 and a capacitor 433. And an output signal of the low-pass filter obtained at the mutual connection point of the resistor 432 and the capacitor 433 is supplied to one of input terminals of a comparator 434. The comparator 434 compares the output signal of the low-pass filter and a reference voltage Vref2 (+1.4 V) supplied to the other of the input terminals. The output signal SG415 of the comparator 434 is supplied to the control section (CPU) of the source apparatus.

The sink apparatus includes a LAN-signal transmission circuit 441, a terminating resistor 442, AC coupling capacitors 443 and 444, a LAN-signal receiving circuit 445, a subtraction circuit 446, a pull-down resistor 451, a resistor 452 and a capacitor 453 forming a low-pass filter, a comparator 454, a choke coil 461, a resistor 462 and a resistor 463. Here, the high-speed data line interface (high-speed data line I/F) includes a LAN-signal transmission circuit 441, a terminating resistor 442, AC coupling capacitors 443 and 444, a LAN-signal receiving circuit 445, and a subtraction circuit 446.

A series circuit of a resistor 462 and a resistor 463 is connected between the power line (+5.0V) and the ground line. And a series circuit of a choke coil 461, an AC coupling capacitor 444, a terminating resistor 442, an AC coupling capacitor 443 and a pull-down resistor 451 is connected between the mutual connection point of the resistor 462 and the resistor 463, and the ground line.

The mutual connection point P3 of the AC coupling capacitor 443 and the terminating resistor 442 is connected to a positive output side of the LAN-signal transmission circuit 441, and a positive input side of the LAN-signal receiving circuit 445. Also, the mutual connection point P4 of the AC coupling capacitor 444 and the terminating resistor 442 is connected to a negative output side of the LAN-signal transmission circuit 441, and a negative input side of the LAN-signal receiving circuit 445. A transmission signal (transmission data) SG417 is supplied to the input side of the LAN-signal transmission circuit 441.

Also, an output signal SG418 of the LAN-signal receiving circuit 445 is supplied to a positive-side terminal of the subtraction circuit 446, and a transmission signal (transmission data) SG417 is supplied to a negative-side terminal of the subtraction circuit 446. In the subtraction circuit 446, the transmission signal SG417 is subtracted from the output signal SG418 of the LAN-signal receiving circuit 445, and thereby a receive signal (receive data) SG419 is obtained.

Also, the mutual connection point Q3 of a pull-down resistor 451 and an AC coupling capacitor 443 is connected to a ground line through a series circuit of a resistor 452 and a capacitor 453. And an output signal of the low-pass filter obtained at the mutual connection point of the resistor 452 and the capacitor 453 is supplied to one of input terminals of a comparator 454. The comparator 454 compares the output signal of the low-pass filter and a reference voltage Vref3 (+1.25 V) supplied to the other of the input terminals. The output signal SG416 of the comparator 454 is supplied to the control section (CPU) of the sink apparatus.

A reserved line 501 and an HPD line 502 included in the HDMI cable forms a differential twisted pair. A source-side terminal 511 of the reserved line 501 is connected to the 14-th pin of the HDMI terminal of the source apparatus, a sink-side terminal 521 of the reserved line 501 is connected to the 14-th pin of the sink apparatus. Also, a source-side terminal 512 of the HPD line 502 is connected to the 19-th pin of the HDMI terminal of the source apparatus, a sink-side terminal 522 of the HPD line 502 is connected to the 19-th pin of the HDMI terminal of the sink apparatus.

In the source apparatus, the above-described mutual connection point Q1 of the pull-up resistor 421 and the AC coupling capacitor 413 is connected to the 14-th pin of the HDMI terminal. Also, the mutual connection point Q2 of the AC coupling capacitor 414 and the pull-down resistor 431 is connected to the 19-th pin of the HDMI terminal. On the other hand, in the sink apparatus, the above-described mutual connection point Q3 of the pull-down resistor 451 and the AC coupling capacitor 443 is connected to the 14-th pin of the HDMI terminal. Also, the mutual connection point Q4 of the above-described choke coil 461 and the AC coupling capacitor 444 is connected to the 19-th pin of the HDMI terminal.

Next, a description will be given of operation of the LAN communication by the high-speed data line I/F, which is configured as described above.

In the source apparatus, the transmission signal (transmission data) SG411 is supplied to the input side of the LAN-signal transmission circuit 411, and the LAN-signal transmission circuit 411 outputs a differential signal (a positive output signal and a negative output signal) corresponding to the transmission signal SG411. And the differential signal output from the LAN-signal transmission circuit 411 is supplied to the connection points P1 and P2, and is transmitted to the sink apparatus through the pair of differential transmission lines (the reserved line 501 and the HPD line 502) of the HDMI cable.

Also, in the sink apparatus, the transmission signal (transmission data) SG417 is supplied to the input side of the LAN-signal transmission circuit 441, and the LAN-signal transmission circuit 441 outputs a differential signal (a positive output signal and a negative output signal) corresponding to the transmission signal SG417. And the differential signal output from the LAN-signal transmission circuit 441 is supplied to the connection points P3 and P4, and is transmitted to the source apparatus through the pair of differential transmission lines (the reserved line 501 and the HPD line 502) of the HDMI cable.

Also, in the source apparatus, the input side of the LAN-signal receiving circuit 415 is connected to the connection points P1 and P2. Accordingly, as an output signal SG412 of the LAN-signal receiving circuit 415, a sum signal is obtained by adding the transmission signal corresponding to the differential signal (current signal) output from the LAN-signal transmission circuit 411 and the receive signal corresponding to the differential signal transmitted from the sink apparatus as described above. The subtraction circuit 416 subtracts the transmission signal SG411 from the output signal SG412 of the LAN-signal receiving circuit 415. Accordingly, the output signal SG413 of the subtraction circuit 416 becomes a signal corresponding to the transmission signal (transmission data) SG417 of the sink apparatus.

Also, in the sink apparatus, the input side of the LAN-signal receiving circuit 445 is connected to the connection points P3 and P4. Accordingly, as an output signal SG418 of the LAN-signal receiving circuit 445, a sum signal is obtained by adding the transmission signal corresponding to the differential signal (current signal) output from the LAN-signal transmission circuit 441 and the receive signal corresponding to the differential signal transmitted from the source apparatus as described above. The subtraction circuit 446 subtracts the transmission signal SG417 from the output signal SG418 of the LAN-signal receiving circuit 445. Accordingly, the output signal SG419 of the subtraction circuit 446 becomes a signal corresponding to the transmission signal (transmission data) SG411 of the source apparatus.

In this manner, it is possible to perform bi-directional LAN communication between the high-speed data line I/F of the source apparatus and the high-speed data line I/F of the sink apparatus.

In this regard, in FIG. 9, the HPD line 502 notifies a connection of the HDMI cable with a sink apparatus at a DC bias level in addition to the above-described LAN communication to the source apparatus. That is to say, the resistors 462 and 463 and the choke coil 461 in the sink apparatus applies a bias of about 4 V to the HPD line 502 through the 19-th pin of the HDMI terminal when the HDMI cable is connected to the sink apparatus. The source apparatus extracts the DC bias of the HPD line 502 by a low-pass filter including the resistor 432 and the capacitor 433, and compares the DC bias with the reference voltage Vref2 (for example, 1.4 V) by the comparator 434.

The voltage of the 19-th pin of the HDMI terminal of the source apparatus is lower than the reference voltage Vref2 because of the existence of the pull-down resistor 431 if the HDMI cable is not connected to a sink apparatus. On the contrary, if the HDMI cable is connected to a sink apparatus, the voltage of the 19-th pin is higher than the reference voltage Vref2. Accordingly, if the HDMI cable is connected to the sink apparatus, the output signal SG415 of the comparator 434 becomes a high level, whereas if not, the signal becomes a low level. Thereby, the control section (CPU) of the source apparatus can recognize whether the HDMI cable is connected to a sink apparatus on the basis of the output signal SG415 of the comparator 434.

Also, in FIG. 9, with a DC bias potential of the reserved line 501, apparatuses that are connected to both ends of the HDMI cable have a function of recognizing with each other whether the opponent is an apparatus capable of LAN communication (hereinafter referred to as an "eHDMI-compatible apparatus") or an apparatus which is not capable of LAN communication (hereinafter referred to as an "eHDMI-noncompatible apparatus").

As described above, the reserved line 501 of the source apparatus is pulled up (+5 V) by the resistor 421, and the reserved line 501 of the sink apparatus is pulled down by the resistor 451. An eHDMI-noncompatible apparatus is not provided with the resistors 421 and 451.

As described above, in the source apparatus, the comparator 424 compares the DC potential of the reserved line 501 having passed through the low-pass filter including the resistor 422 and the capacitor 423 with the reference voltage Vref1. If the sink apparatus is an eHDMI-compatible apparatus, and has the pull-down resistor 451, the voltage of the reserved line 501 becomes 2.5 V. However, if the sink apparatus is an eHDMI-noncompatible apparatus, and does not have the pull-down resistor 451, the voltage of the reserved line 501 becomes 5 V by the existence of the pull-up resistor 421.

Accordingly, the reference voltage Vref1 becomes, for example, 3.75 V so that the output signal SG414 of the comparator 424 becomes a low level if the sink apparatus is an eHDMI-compatible apparatus, whereas the output signal becomes a high level if the sink apparatus is not an eHDMI-compatible apparatus. Thereby, the control section (CPU) of the source apparatus can recognize whether the sink apparatus is an eHDMI-compatible apparatus or not on the basis of the output signal SG414 of the comparator 424.

In the same manner, as described above, in the sink apparatus, the comparator 454 compares the DC potential of the reserved line 501 having passed through the low-pass filter including the resistor 452 and the capacitor 453 with the reference voltage Vref3. If the source apparatus is an eHDMI-compatible apparatus, and has the pull-up resistor 421, the voltage of the reserved line 501 becomes 2.5 V. However, if the source apparatus is an eHDMI-noncompatible apparatus, and does not have the pull-up resistor 421, the voltage of the reserved line 501 becomes 0 V by the existence of the pull-down resistor 451.

Accordingly, the reference voltage Vref3 becomes, for example, 1.25 V so that the output signal SG416 of the comparator 454 becomes a high level if the source apparatus is an eHDMI-compatible apparatus, whereas the output signal becomes a low level if the sink apparatus is not an eHDMI-compatible apparatus. Thereby, the control section (CPU) of the sink apparatus can recognize whether the source apparatus is an eHDMI-compatible apparatus or not on the basis of the output signal SG416 of the comparator 454.

By the example of the configuration shown in FIG. 9, in an interface in which video and audio data is transmitted, connected apparatus information is exchanged and authenticated, apparatus control data is communicated, and LAN communication is performed with one HDMI cable, LAN communication is performed by bi-directional communication through a pair of differential transmission lines, and the connection state of the interface is notified by at least one of DC bias potentials out of transmission lines. Thus, it becomes possible to carry out spatial separation in which the SCL line and the SDA line are not used for LAN communication. As a result, it is possible to form a circuit for LAN communication irrelevantly to electrical specification defined on DDC, and to achieve a stable and reliable LAN communication at low cost.

In this regard, the pull-up resistor 421 shown in FIG. 9 may not be in the source apparatus, and may be disposed in the HDMI cable. In such a case, individual terminals of the pull-up resistor 421 are connected to lines (signal line) connected to the reserved line 501 and the power source (power-source potential), respectively, among the lines disposed in the HDMI cable.

Further, the pull-down resistor 451 and the resistor 463 shown in FIG. 9 may not be in the sink apparatus, and may be disposed in the HDMI cable. In such a case, individual terminals of the pull-down resistor 451 are connected to the reserved line 501 and the line (ground line) connected to ground (reference potential), respectively among the lines disposed in the HDMI cable. Also, the individual terminals of the resistor 463 are connected to the HPD line 502 and the line (ground line) connected to ground (reference potential), respectively, among the lines disposed in HDMI cable.

Operation of Image Display System

A description will be given of an example of the operation of the image display system 50 in the above-described FIG. 1 (FIG. 2 and FIG. 4). In this regard, a description will be omitted of an audio system.

When the user operates the disc recorder 100 so as to transmit a video signal (image data), the codec 117 supplies the video signal to be transmitted to the video-signal processing section 120. Here, the video signal to be transmitted is the uncompressed video signal supplied from the tuner 116 or the external terminal 121, or the uncompressed video signal obtained by decoding in the codec 117. The user is allowed to select any one of the video signals as the video signal to be transmitted by operating the user operation section 112.

In the video-signal processing section 120, processing, such as aspect conversion processing, noise reduction processing, etc., is performed on the transmission video signal on the basis of the user setting to the disc recorder 100, or the setting information transmitted from the projector 200. The uncompressed transmission video signal output from the video-signal processing section 120 is supplied to the HDMI transmission section 102. In this manner, the video signal supplied to the HDMI transmission section 102 is transmitted in one direction to the projector 200 through the HDMI cable 300 by the communication conforming to HDMI.

In the projector 200, the HDMI receiving section 202 receives the uncompressed video signal transmitted in one direction from the disc recorder 100 through the HDMI cable 300 by the communication conforming to HDMI. The received video signal obtained by the HDMI receiving section 202 is supplied to the video-signal processing section 214.

The video-signal processing section 214 performs, for example, thinning processing, scaling processing, etc., on the receive video signal in order to produce a video signal corresponding to the aspect setting of the display image. Also, the video-signal processing section 214 performs noise reduction processing on the basis of the user's noise-reduction setting, or the image-quality adjustment information, etc., supplied from the disc recorder 100. Also, the video-signal processing section 214 performs gamma characteristic processing on the basis of the set gamma characteristic. The video signal processed by the video-signal processing section 214 is supplied to the video-signal adjustment section 215.

The video-signal adjustment section 215 performs color gamut processing, color temperature processing, and gamma characteristic processing on the receive image signal processed by the video-signal processing section 214 on the basis of the user setting to the projector 200, or the image-quality adjustment information, etc., supplied from the disc recorder 100. The receive video signal having been subjected to the image-quality adjustment by the video-signal adjustment section 215 is supplied to the display section 216, and the image based on the receive video signal is displayed onto the display section 216.

Operation Related to Transmission of Image-Quality Adjustment Information Corresponding to Transmission Video Signal Next, a description will be given of operation related to the transmission, from the disc recorder 100 to the projector 200, of the image-quality adjustment information corresponding to the transmission video signal.

The control section 111 of the disc recorder 100 outputs the image-quality adjustment information to the Ethernet transmission and receiving circuit 104 periodically, or when the contents of a content of the transmission video signal is changed, etc. As described above, the image-quality adjustment information is the information indicating, for example, the information corresponding to the contents of a content of the transmission video signal transmitted from the HDMI transmission section 102, or information indicating whether the transmission video signal is an analog-broadcast video signal. The Ethernet transmission and receiving circuit 104 outputs the Ethernet signal including the image-quality adjustment information. The Ethernet signal is transmitted from the HDMI terminal 101 to the projector 200 through the HDMI cable 300 through the high-speed data line I/F 103.

The high-speed data line I/F 203 of the projector 200 supplies the Ethernet signal transmitted from the disc recorder 100 through the HDMI cable 300 to the Ethernet transmission and receiving circuit 204. The image-quality adjustment information extracted from the Ethernet signal by the Ethernet transmission and receiving circuit 204 is supplied to the control section 211. And the control section 211 controls the operation of the video-signal processing section 214 and the video-signal adjustment section 215 on the basis of the image-quality adjustment information.

For example, if the image-quality adjustment information is the information corresponding to the contents of a content of the receive video signal received by the HDMI receiving section 202, the following control operation is performed. That is to say, the image-quality adjustment values, such as a color gamut, a color temperature, a gamma characteristic, etc., of the video-signal processing section 214 and the video-signal adjustment section 215 are set to the values corresponding to the contents of a content of the receive video signal. The video-signal adjustment section 215 performs the image-quality adjustment processing corresponding to the contents of a content of the video signal on the receive video signal, for example, a color gamut processing, a color temperature processing, a gamma characteristic processing, etc. Also, for example, when the image-quality adjustment information is the information indicating whether the receive video signal is analog-broadcast video signal or not, if the receive video signal is analog video signal, the video-signal processing section 214 performs noise reduction processing.

Operation Related to Transmission of Setting Information Related to Receive-Video-Signal Processing Next, a description will be given of an operation of the transmission of the setting information related to the receive-video-signal processing from the projector 200 to the disc recorder 100.

The control section 211 of the projector 200 outputs the setting information to the Ethernet transmission and receiving circuit 204 periodically, or when the setting is changed, etc. As described above, the setting information is, for example, aspect-setting information of the display image, on/off setting information of noise reduction, etc. The Ethernet transmission and receiving circuit 204 outputs the Ethernet signal including the setting information. The Ethernet signal is transmitted from the HDMI terminal 201 to the disc recorder 100 by the high-speed data line I/F 203 through the HDMI cable 300.

The high-speed data line I/F 103 of the disc recorder 100 supplies the Ethernet signal transmitted from the projector 200 through the HDMI cable 300 to the Ethernet transmission and receiving circuit 104. The setting information extracted from the Ethernet signal by the Ethernet transmission and receiving circuit 104 is supplied to the control section 111. And the control section 111 controls the operation of the video-signal processing section 120 on the basis of the setting information.

For example, if the received setting information is the aspect-setting information of the display image, the video-signal processing section 120 performs processing matching the aspect of the transmission video signal with the aspect of the display image. Also, for example, when the received setting information is off-setting information of noise reduction, if the transmission video signal is an analog-broadcast video signal, the video-signal processing section 120 performs noise reduction processing.

As described above, in the image display system 50 shown in FIG. 1, the image-quality adjustment information corresponding to the transmission video signal is transmitted from the disc recorder 100 to the projector 200. Accordingly, the projector 200 can automatically carry out the image-quality adjustment setting matched with the transmitted video signal on the basis of the image-quality adjustment information. That is to say, it is possible to automatically carry out the setting matched with the receive video signal. Accordingly, it is not necessary for the user to set the image-quality adjustment values, such as a color gamut, a color temperature, a gamma characteristic, etc., to meet the contents of the content in the projector 200 when the contents of a content of the receive video signal has been changed. Thus, it is possible to reduce user's time and effort for the setting. Also, it is possible to achieve the image-quality adjustment that meets the contents of a content in the projector 200 all the time.

Also, in the image display system 50 shown in FIG. 1, the image-quality adjustment information is transmitted through a communication path including a pair of differential transmission lines (the reserved line and the HPD line) included in the HDMI cable (transmission line) used for transmitting the video signal. Accordingly, it is not necessary to provide another cable for transmitting the image-quality adjustment information. Thus, it is possible to prevent an increase in cost and complexity of connection.

Also, in the image display system 50 shown in FIG. 1, the setting information related to the video signal in the video-signal processing section 214 is transmitted from the projector 200 to the disc recorder 100. Thus, it is possible for the disc recorder 100 to automatically change the processing of the transmission video signal to the projector 200 on the basis of the setting information. Accordingly, if the setting of the processing on the receive video signal is changed in the projector 200, it is not necessary for the user to change the setting of the processing on the transmission video signal in the disc recorder 100 in order to meet that setting. Thereby, it is possible to reduce the user's time and effort for the setting.

For example, if the user carries out aspect setting of a display image in the projector 200, it is possible to automatically match the aspect of the transmission video signal with the set aspect of the projector 200 on the basis of the setting information in the disc recorder 100. Thereby, it becomes easy to perform processing, such as thinning processing, scaling processing, etc., in the projector 200. Also, for example, if the user carries out off-setting of noise reduction in projector 200, the disc recorder 100 automatically performs noise-reduction processing, for example, on an analog-broadcast video signal on the basis of the setting information, thereby reducing noise.

Also, in the image display system 50 shown in FIG. 1, the setting information is transmitted through a communication path including a pair of differential transmission lines (the reserved line and the HPD line) included in the HDMI cable (transmission line) used for transmitting the video signal. Accordingly, it is not necessary to provide another cable for transmitting the setting information. Thus, it is possible to prevent an increase in cost and complexity of connection.

2. Second Embodiment

Configuration of Image Display System

FIG. 10 illustrates an example of a configuration of an image display system 50A according to a second embodiment. The image display system 50A includes a personal computer 100A as a source apparatus and a projector 200 as a sink apparatus. In FIG. 10, same reference numerals are given to denote same parts as those in FIG. 1, and the detailed description will be omitted accordingly.

Here, the personal computer 100A constitutes a transmission apparatus, and the projector 200 constitutes a display apparatus. In the image display system 50A, the personal computer 100A and the projector 200 are eHDMI-compatible apparatuses. Here, an eHDMI-compatible apparatus means that it is possible to perform communication using a communication path including a pair of differential transmission lines (for example, a reserve line and a HPD line) included in an HDMI cable.

The disc recorder 100A and the projector 200 are connected through an HDMI cable 300. Here, the HDMI cable 300 constitutes a transmission line. That is to say, the disc recorder 100A includes an HDMI terminal 101, and the projector 200 includes an HDMI terminal 201. One end of the HDMI cable 300 is connected to the HDMI terminal 101 of the personal computer 100A, and the other end of the HDMI cable 300 is connected to the HDMI terminal 201 of the projector 200.

The personal computer 100A has an HDMI transmission section 102 and a high-speed data line interface (I/F) 103, which are connected to the HDMI terminal 101. An Ethernet transmission and receiving circuit 104 is connected to the high-speed data line I/F 103. The HDMI transmission section 102 transmits uncompressed (baseband) video (image) data and audio data from the HDMI terminal 101 by the communication conforming to the HDMI standard.

A description will be given of operation of the image display system 50A shown in FIG. 10. The video and audio data to be transmitted from the personal computer 100A to the projector 200 is transmitted from the HDMI transmission section 102 of the personal computer 100A to the projector 200 through the HDMI cable 300 by the communication conforming to HDMI. Also, an HDMI receiving section 202 of the projector 200 receives the video and audio data transmitted from the personal computer 100A through the HDMI cable 300 by the communication conforming to HDMI. The projector 200 displays an image and outputs sound on the basis of the received video and audio data.

Also, bi-directional communication conforming to the Internet Protocol (IP) is performed between the Ethernet transmission and receiving circuit 104 of the personal computer 100A and the Ethernet transmission and receiving circuit 204 of the projector 200 through the HDMI cable 300.

In this embodiment, an image-quality adjustment tool for a projector is installed in the personal computer 100A. The image-quality adjustment information generated by the image-quality adjustment tool for a projector is transmitted from the Ethernet transmission and receiving circuit 104 of the personal computer 100A to the Ethernet transmission and receiving circuit 204 of the projector 200. The image-quality adjustment information includes, for example, information of a color gamut, a color temperature, and a gamma characteristic, etc. In the projector 200, image-quality adjustment values of the processing section of the receive video signal, not shown in the figure, are set on the basis of the above-described image-quality adjustment information received by the Ethernet transmission and receiving circuit 204.

Configuration of Personal Computer

FIG. 11 illustrates an example of a configuration of the personal computer 100A. The personal computer 100A has an HDMI terminal 101, an HDMI transmission section 102, a high-speed data line I/F 103, and an Ethernet transmission and receiving circuit 104. Also, the personal computer 100A has a CPU (Central processing Unit) 131, a ROM (Read Only Memory) 132, a RAM (Random Access Memory) 133, and a bus 134. Also, the personal computer 100A has an input/output interface 135, an input section 136, an output section 137, a storage section 138, a drive 139, and a network terminal 140.

In the personal computer 100A, the CPU 131, the ROM 132, the RAM 133, and the bus 134 are mutually connected. Further, an input/output interface 135 is connected to the bus 134. An input section 136, an output section 137, a storage section 138, a drive 139 and an HDMI transmission section (HDMI TX) 102 are connected to the input/output interface 135.

The input section 136 includes a keyboard, a mouse, a microphone, etc. The output section 137 includes a display, a speaker, etc. The storage section 138 includes an HDD (Hard Disk Drive), a nonvolatile memory, etc. The drive 139 drives a removable media, such as a magnetic disk, an optical disc, a magneto-optical disc, or a memory card, etc.

Also, the Ethernet transmission and receiving circuit 104 is connected to the bus 134. A network terminal 140 and a high-speed data line I/F 103 are connected to the Ethernet transmission and receiving circuit 104.

In the personal computer 100A configured as shown in FIG. 11, the CPU 131 loads a program stored, for example, in the storage section 138 to the RAM 133 through the input/output interface 135 and the bus 134, and executes the program. The above-described image-quality adjustment tool for a projector is installed in the storage section 138.

The HDMI transmission section 102 transmits the uncompressed video signal for an image display of the personal computer 100A to the projector 200 in one direction through the HDMI cable 300 by the communication conforming to HDMI.

As described above, the high-speed data line I/F 103 is a bi-directional communication interface using a communication path including a pair of differential transmission lines (the reserved line and the HPD line) included in the HDMI cable 300. The high-speed data line I/F 103 is inserted between the Ethernet transmission and receiving circuit 104 and the HDMI terminal 101.

The high-speed data line I/F 103 transmits the transmission data supplied from the CPU 131 through the Ethernet transmission and receiving circuit 104 to the projector 200 through the HDMI terminal 101 and the HDMI cable 300. Also, the high-speed data line I/F 103 supplies the receive data received from the projector 200 through the HDMI cable 300 and the HDMI terminal 101 to the CPU 131 through the Ethernet transmission and receiving circuit 104. In this regard, a network terminal 140 is connected to the Ethernet transmission and receiving circuit 104. The personal computer 100A can be connected to an Ethernet network using the network terminal 140.

Bi-directional communication conforming to the Internet Protocol (IP) is performed between the Ethernet transmission and receiving circuit 104 of the personal computer 100A and the Ethernet transmission and receiving circuit 204 of the projector 200 through the HDMI cable 300.

In this embodiment, as described above, an image-quality adjustment tool for a projector is installed in the personal computer 100A. As the transmission data transmitted from the personal computer 100A to the projector 200, the image-quality adjustment information generated by the above-described image-quality adjustment tool for a projector is provided. The CPU 131 outputs the image-quality adjustment information to the Ethernet transmission and receiving circuit 104, and transmits an Ethernet signal including the image-quality adjustment information to the projector 200. The image-quality adjustment information includes, for example, information of a color gamut, a color temperature, a gamma characteristic, etc.

Operation of Image Display System

A description will be given of an example of operation of the image display system 50A in the above-described FIG. 10 (FIG. 11 and FIG. 4). In this regard, a description will be omitted on an audio system.

The image-display video signal of the personal computer 100A is supplied to the HDMI transmission section 102 through the input/output interface 135. In this manner, the video signal supplied to the HDMI transmission section 102 is transmitted in one direction to the projector 200 through the HDMI cable 300 by the communication conforming to HDMI.

In the projector 200, the HDMI receiving section 202 receives the uncompressed video signal transmitted from the personal computer 100A in one direction through the HDMI cable 300 by the communication conforming to HDMI. The received video signal obtained by the HDMI receiving section 202 is supplied to the video-signal processing section 214. The video-signal processing section 214 performs, for example, thinning processing, scaling processing, etc., on the received video signal in accordance with the aspect setting of the display image. The video signal processed by the video-signal processing section 214 is supplied to the video-signal adjustment section 215.

The video-signal adjustment section 215 performs color-gamut processing, color-temperature processing, and gamma-characteristic processing, etc., on the receive image signal processed by the video-signal processing section 214 on the basis of the user setting on the projector 200 or the image-quality adjustment information, etc. from the personal computer 100A. The receive video signal having been subjected to the image-quality adjustment by the video-signal adjustment section 215 is supplied to the display section 216. The image from the personal computer 100A, based on the receive video signal, is displayed onto the display section 216.

Operation Related to Transmission of Image-Quality Adjustment Information

Next, a description will be given of operation related to transmission of image-quality adjustment information generated by a projector image-quality adjustment tool from the computer 100A to the projector 200.

In the personal computer 100A, at the time of starting an image-quality adjustment tool for a projector, the CPU 131 outputs the image-quality adjustment information to the Ethernet transmission and receiving circuit 104 in response to a user operation. The Ethernet transmission and receiving circuit 104 outputs an Ethernet signal including the image-quality adjustment information. The Ethernet signal is transmitted by the high-speed data line I/F 103 from the HDMI terminal 101 to the projector 200 through the HDMI cable 300.

The high-speed data line I/F 203 of the projector 200 supplies the Ethernet signal transmitted from the personal computer 100A through the HDMI cable 300 to the Ethernet transmission and receiving circuit 204. The image-quality adjustment information extracted from the Ethernet signal by the Ethernet transmission and receiving circuit 204 is supplied to the control section 211. And the control section 211 sets image-quality adjustment values, such as a color gamut, a color temperature, a gamma characteristic, etc., to the video-signal processing section 214 and the video-signal adjustment section 215 on the basis of the image-quality adjustment information.

As described above, in the image display system 50A shown by FIG. 10, the image-quality adjustment information generated by the image-quality adjustment tool for a projector is transmitted from the personal computer 100A to the projector 200. The image-quality adjustment information is transmitted through a communication path including a pair of differential transmission lines (a reserved line and an HPD line) included in an HDMI cable (transmission line) used for transmitting the video signal. Accordingly, it is not necessary to provide another cable for transmitting the image-quality adjustment information, for example, an RS232C cable, an Ether (RJ45) cable, etc. Thus, it is possible to prevent an increase in cost, complexity of connection, and troublesomeness of connection.

3. Variation

In this regard, in the above-described embodiment, an example has been shown of the case where the image-quality adjustment information and the setting information is transmitted between the source apparatus and the sink apparatus through a communication path including a pair of differential transmission lines (for example, a reserved line and an HPD line) included in an HDMI cable. However, for a communication path, a CEC line, which is a control data line of an HDMI cable, can also be used.

Also, in the above-described embodiment, an example is shown of the case where the transmission apparatus is a disc recorder or a personal computer, and the display apparatus is a projector. However, the transmission apparatus and the display apparatus are not limited to these apparatuses. The present invention can be applied to an image display system including the other transmission apparatuses and display apparatuses in the same manner.

Also, in the above-described embodiment, a description has been given on the assumption that a transmission line connecting each apparatus is an interface of the HDMI standard. However, the present invention can be applied to the other similar transmission lines as a matter of course.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission apparatus comprising:
a video-signal transmission section transmitting a video signal to an external apparatus by a differential signal through a plurality of channels through a transmission line, wherein the video signal corresponds to program content, the video signal comprising a plurality of video signal segments, wherein each video signal segment corresponds to a different segment of the program content; and
an information transmission section transmitting image-quality adjustment information corresponding to the video signal transmitted by the video-signal transmission section to the external apparatus through a communication path formed by a pair of differential transmission lines included in the transmission line, wherein the image-quality adjustment information comprises image-quality data corresponding to each program segment, each video signal segment of the video signal being independently adjustable from the other video signal segments based on the corresponding image-quality data,
wherein the image-quality adjustment information is transmitted as a differential signal that is supplied to a hot plug detect (HPD) line and a reserved line of a high-definition multimedia interface (HDMI) of the transmission apparatus from an Ethernet transmission and receiving circuit through a high speed data line interface.

2. The transmission apparatus according to claim 1, further comprising an information output section outputting the image-quality adjustment information corresponding to the video signal on the basis of the image-quality data of each video signal segment of the video signal.

3. The transmission apparatus according to claim 2, wherein the image-quality adjustment information includes at least one of a color gamut, a color temperature, and a gamma characteristic.

4. The transmission apparatus according to claim 1, wherein the image-quality adjustment information corresponding to the video signal is information indicating whether the video signal transmitted by the video-signal transmission section is an analog-broadcast video signal or not.

5. The transmission apparatus according to claim 1, further comprising:
an information receiving section receiving setting information related to processing of the video signal from the external apparatus through the communication path; and
a signal processing section processing the video signal transmitted by the video-signal transmission section on the basis of the setting information received by the information receiving section.

6. A display apparatus comprising:
a video-signal receiving section receiving a video signal from an external apparatus by a differential signal through a plurality of channels through a transmission line, wherein the video signal corresponds to program content, the video signal comprising a plurality of video signal segments, wherein each video signal segment corresponds to a different segment of the program content;
a signal processing section processing the video signal received by the video-signal receiving section;
a display section displaying an image based on the video signal processed by the signal processing section;
an information transmission section transmitting setting information related to processing of the video signal in the signal processing section to the external apparatus through a communication path formed by a pair of differential transmission lines included in the transmission line;
an information receiving section receiving image-quality adjustment information corresponding to the video signal received by the video-signal receiving section from the external apparatus through the communication path; and
a control section setting an image-quality adjustment information value for each video signal segment of the video signal received by the video-signal receiving section in the signal processing section on the basis of the image-quality adjustment information received by the information receiving section, wherein each video signal segment of the video signal is independently adjustable from the other video signal segments based on the corresponding image-quality adjustment information value,
wherein the image-quality adjustment information is transmitted as a differential signal that is supplied to a hot plug detect (HPD) line and a reserved line of a high-definition multimedia interface (HDMI) of the external apparatus from an Ethernet transmission and receiving circuit through a high speed data line interface.

7. An image display system including a transmission apparatus and a display apparatus connected with each other through a transmission line, the image display system comprising:
the transmission apparatus including
a video-signal transmission section transmitting a video signal to the display apparatus by a differential signal through a plurality of channels through a transmission line, wherein the video signal corresponds to program content, the video signal comprising a plurality of video signal segments, wherein each video signal segment corresponds to a different segment of the program content,
an information transmission section transmitting image-quality adjustment information corresponding to the video signal transmitted by the video-signal transmission section to the display apparatus through a communication path formed by a pair of differential transmission lines included in the transmission line, wherein the video signal corresponds to program content, the video signal comprising a plurality of video signal segments, wherein each video signal segment corresponds to a different segment of the program content,
an information receiving section receiving setting information related to processing of the video signal from the display apparatus through the communication path, and
a signal processing section processing the video signal transmitted by the video-signal transmission section on the basis of the setting information received by the information receiving section; and
the display apparatus including
a video-signal receiving section receiving a video signal from an external apparatus by a differential signal through a plurality of channels through a transmission line,
a signal processing section processing the video signal received by the video-signal receiving section,
a display section displaying an image based on the video signal processed by the signal processing section,
an information transmission section transmitting setting information related to processing of the video signal in the signal processing section to the transmission apparatus through the communication path,
an information receiving section receiving image-quality adjustment information corresponding to the video signal received by the video-signal receiving section from the transmission apparatus through the communication path, and
a control section setting an image-quality adjustment information value for the video signal received by the video-signal receiving section in the signal processing section on the basis of the image-quality adjustment information received by the information receiving section,
wherein the image-quality adjustment information is transmitted as a differential signal that is supplied to a hot plug detect (HPD) line and a reserved line of a high-definition multimedia interface (HDMI) of the external apparatus from an Ethernet transmission and receiving circuit through a high speed data line interface.

* * * * *